US011265763B2

(12) United States Patent
Thubert et al.

(10) Patent No.: US 11,265,763 B2
(45) Date of Patent: Mar. 1, 2022

(54) REVERSE OPERATIONS, ADMINISTRATION AND MAINTENANCE (OAM) SIGNALING IN A MESH NETWORK

(71) Applicant: Cisco Technology, Inc., San Jose, CA (US)

(72) Inventors: Pascal Thubert, Roquefort les Pins (FR); Patrick Wetterwald, Mouans Sartoux (FR); Eric Levy-Abegnoli, Valbonne (FR); Xiaoguang Jason Chen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 225 days.

(21) Appl. No.: 16/594,316

(22) Filed: Oct. 7, 2019

(65) Prior Publication Data

US 2021/0105668 A1 Apr. 8, 2021

(51) Int. Cl.
*H04W 8/22* (2009.01)
*H04W 28/22* (2009.01)

(52) U.S. Cl.
CPC .................................. *H04W 28/22* (2013.01)

(58) Field of Classification Search
CPC ..................................................... H04W 28/22
USPC ........................................................ 370/328
See application file for complete search history.

(56) References Cited

U.S. PATENT DOCUMENTS 7,693,064 B2 4/2010 Thubert et al.
8,862,774 B2 10/2014 Vasseur et al.
9,100,328 B1 8/2015 Atlas
9,325,626 B2 4/2016 Vasseur
9,379,971 B2 6/2016 Sem-Jacobsen et al.
2004/0193728 A1* 9/2004 Doshi ................. H04L 41/0663
709/238
2007/0091811 A1* 4/2007 Thubert .................. H04L 43/08
370/238
2011/0188380 A1* 8/2011 Song .................. H04L 43/0829
370/241.1

(Continued)

FOREIGN PATENT DOCUMENTS

EP       2662778 A1 * 11/2013 ........... H04L 47/125
WO  WO-2006102840 A1 * 10/2006 ......... H04L 43/0829

OTHER PUBLICATIONS

Gnawali, et al., "The Minimum Rank with Hysteresis Objecive Function", Request for Comments 6719, Sep. 2012, 13 pages, IETF Trust.

(Continued)

*Primary Examiner* — Jamaal Henson
(74) *Attorney, Agent, or Firm* — Behmke Innovation Group LLC; Kenneth J. Heywood; Jonathon P. Western

(57) ABSTRACT

In one embodiment, a device in a mesh network joins a source-destination oriented partial directed acyclic graph (SDO-PDAG) between a source node and a destination node in the network. The device receives operations, administration and maintenance (OAM) packets flooded along reverse paths of the SDO-PDAG. The device determines, based on the received OAM packets, packet drop rate (PDR) capacities of different paths between the device and the destination node. The device replicates a data packet sent from the source node to the destination node along two or more of the paths between the device and the destination node, based on the determined PDR capacities of those paths.

20 Claims, 20 Drawing Sheets

(56) References Cited

U.S. PATENT DOCUMENTS

| | | | | |
|---|---|---|---|---|
| 2013/0024560 A1* | 1/2013 | Vasseur | ............... | H04L 41/12 |
| | | | | 709/224 |
| 2013/0067063 A1* | 3/2013 | Vasseur | ............... | H04L 45/36 |
| | | | | 709/224 |
| 2015/0180788 A1* | 6/2015 | Kompella | ............ | H04L 45/22 |
| | | | | 370/236.2 |
| 2016/0269188 A1 | 9/2016 | Thubert et al. | | |
| 2018/0063018 A1* | 3/2018 | Bosch | ............... | H04L 45/306 |
| 2019/0273813 A1* | 9/2019 | Mirsky | ............ | H04L 47/125 |

OTHER PUBLICATIONS

Thubert, Pascal, "An Architecture for IPv6 over the TSCH mode of IEEE 802.15.4", Internet Draft: draft-ietf-6tisch-architecture-19, Dec. 2018, 60 pages, IEFT Trust.

Thubert, et al., "BIER-TE Extensions for Packet replication and Elimination Function (PREF) and OAM", Internet Draft: draft-thubert-bier-replication-elimination-03, Mar. 2018, 15 pages, IETF Trust.

Thubert, Pascal, "Objective Function Zero for the Routing Protocol for Low-Power and Lossy Networks (RPL)", Request for Comments 6552, Mar. 2012, 14 pages, IETF Trust.

Thubert, et al., "Root Initiated Routing State in RPL", Internet Draft, draft-ieft-roll-dao-projection-09, Nov. 2019, 31 pages, IETF Trust.

Thubert, et al., "Root Initiated Routing State in RPL", Internet Draft, draft-ieft-roll-dao-projection-06, May 2019, 25 pages, IETF Trust.

Vasseur, et al., "Routing Metrics Used for Path Calculation in Low-Power and Lossy Networks", Request for Comments 6551, Mar. 2012, 30 pages, IETF Trust.

Winter, eta l., "RPL: IPv6 Routing Protocol for Low-Power and Lossy Networks", Request for Comments 6550, Mar. 2012, 157 pages, IETF Trust.

* cited by examiner

REVERSE OPERATIONS, ADMINISTRATION AND MAINTENANCE (OAM) SIGNALING IN A MESH NETWORK

TECHNICAL FIELD

The present disclosure relates generally to computer networks, and, more particularly, to reverse operations, administration and maintenance (OAM) signaling in a mesh network.

BACKGROUND

Mesh networks, which typically take the form of Low power and Lossy Networks (LLNs), have a myriad of applications. For example, many sensor networks are implemented as mesh networks. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location may be a smart meter that communicates wirelessly and/or using the electrical power distribution line itself as a communication medium.

While Smart Grids and other sensor networks were initially designed for purposes of simply collecting data, such as meter readings, there has been recent interest in extending these forms of networks to also support automation (e.g., control loops). However, doing so would be no trivial task, as traditional mesh networks/LLNs lack the operations, administration and maintenance (OAM) signaling that is necessary to ensure the delivery of messages in a deterministic and reliable manner, while still taking into account the various constraints of the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
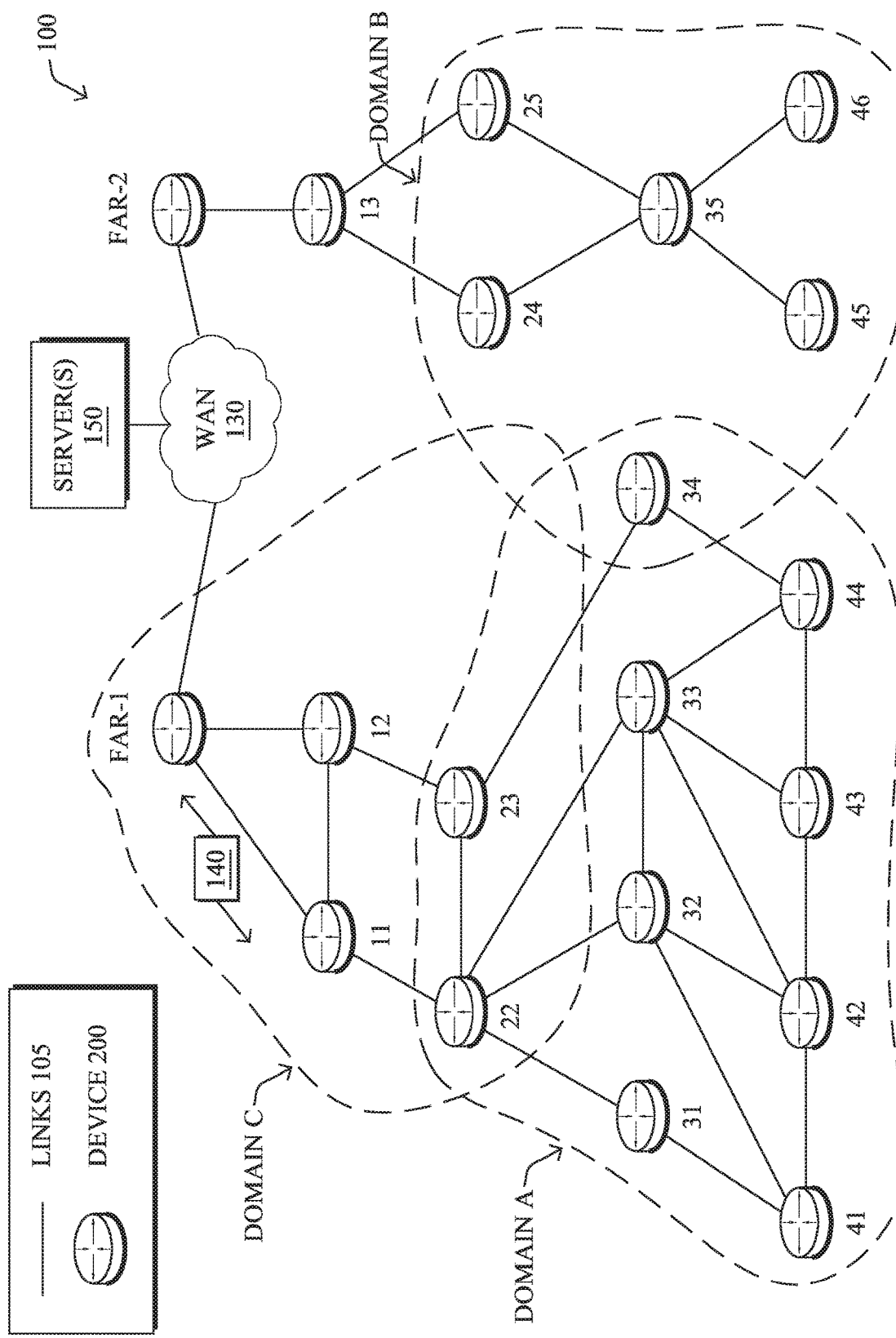
FIG. 1 illustrates an example communication network.

According to one or more embodiments of the disclosure, a device in a mesh network joins a source-destination oriented partial directed acyclic graph (SDO-PDAG) between a source node and a destination node in the network. The device receives operations, administration and maintenance (OAM) packets flooded along reverse paths of the SDO-PDAG. The device determines, based on the received OAM packets, packet drop rate (PDR) capacities of different paths between the device and the destination node. The device replicates a data packet sent from the source node to the destination node along two or more of the paths between the device and the destination node, based on the determined PDR capacities of those paths.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications)

temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "FAR-1," "FAR-2," and "11," "12,"... "46," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while network 100 is shown in a certain orientation, particularly with a field area router (FAR) node, the network 100 is merely an example illustration that is not meant to limit the disclosure. Also as shown, a particular FAR (e.g., FAR-1) may communicate via a WAN 130 with any number of servers 150, such as a path computation element (PCE), network management service (NMS), or other supervisory device.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, Wi-Fi, Bluetooth®, etc.), PLC protocols, or other shared-media protocols where appropriate. In this context, a protocol consists of a set of rules defining how the nodes interact with each other. One communication technique that may be used to implement links 105 is channel-hopping. Also known as frequency hopping, use of such a technique generally entails wireless devices "hopping" (e.g., alternating) between different transmission and reception frequencies according to a known schedule. Network 100 may also be divided into any number of wireless domains (e.g., domains A-C) in which nodes 200 may communicate.

In some embodiments, network 100 may be configured as a deterministic network. Generally, deterministic networking refers to networks that can guaranty the delivery of packets within a bounded time. For example, industrial networking typically requires predictable communications between devices (e.g., to actuate a machine along an assembly line at a precise time, etc.). This translates into the following criteria: 1.) a high delivery ratio (e.g., a loss rate of 10-5 to 10-9, depending on the application), 2.) fixed latency, and 3.) jitter close to zero (e.g., on the order of microseconds).

A limited degree of control over the timing of network traffic can be achieved by using quality of service (QoS) tagging and/or performing traffic shaping/admission control. For time sensitive flows, though, latency and jitter can only be fully controlled by scheduling every transmission at every hop. In turn, the delivery ratio can be optimized by applying packet redundancy with all possible forms of diversity in terms of space, time, frequency, code (e.g., in CDMA), hardware (e.g., links, routers, etc.), software (implementations), etc. Most of the methods above apply to both Ethernet and wireless technologies. Mixed approaches may combine QoS technologies with scheduling (e.g., triggering emission of packets on the different QoS queues using a schedule-based gate mechanism).

Figure 2:
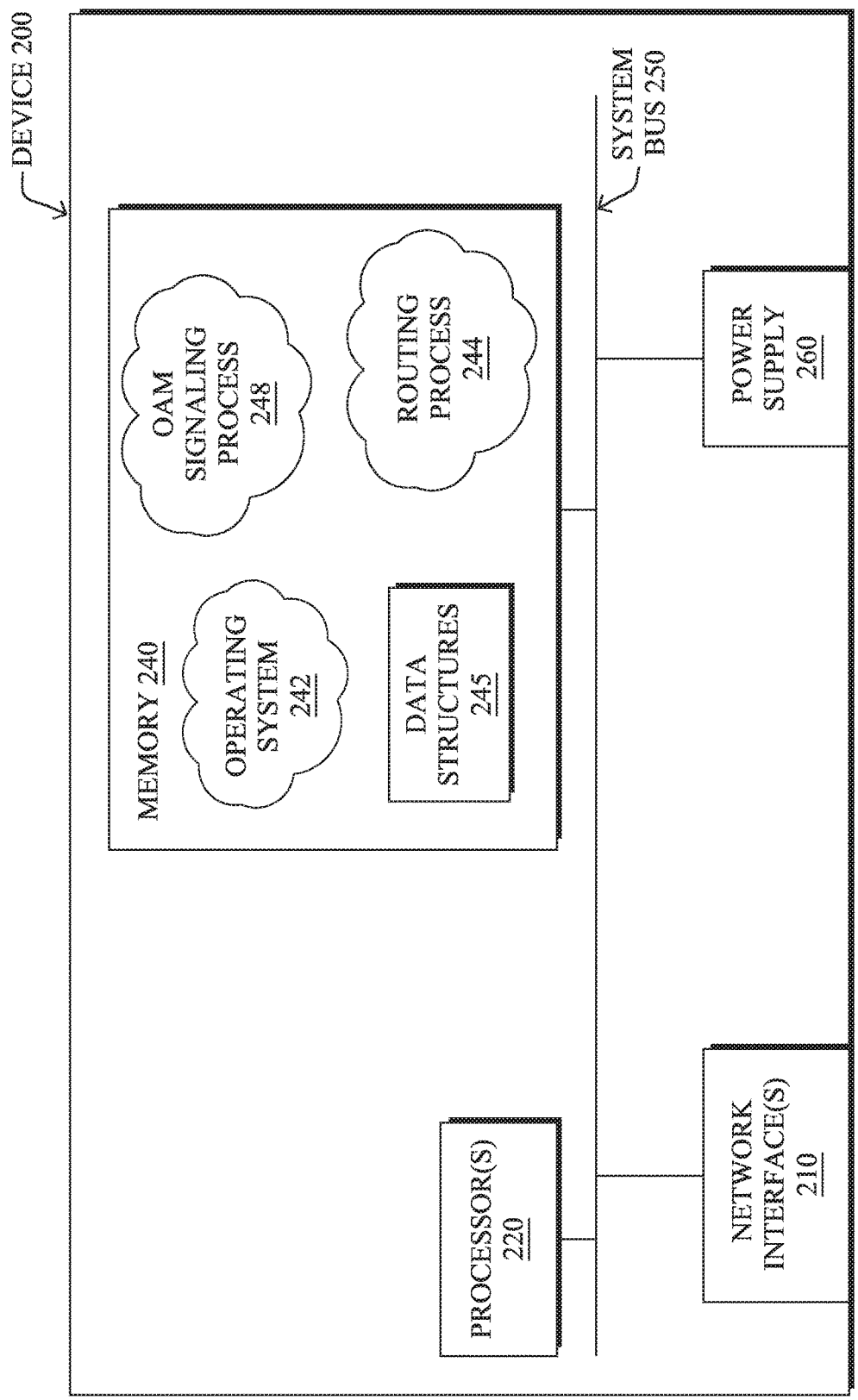
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210, e.g., transceivers, include the mechanical, electrical, and signaling circuitry for communicating data over links 105 coupled to the network 100. The network interfaces may be configured to transmit and/or receive data using a variety of different communication protocols, particularly for frequency-hopping communication as described herein. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 includes a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may include hardware elements or hardware logic configured to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may include routing process/services 244, and an illustrative operations, administration and management (OAM) signaling process 248 as described in greater detail below. Note that while processes 244, 248 are shown in centralized memory 240, alternative embodiments provide for either or both of processes 244, 248 to be operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low-power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnects are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Deterministic networking is a fundamental component of the IoT, and is needed for time critical applications such as industrial automation, inflight control systems, internal vehicle networking, and the like. Most of these application fields are mission critical and require novel solution since up to recently they are manual controlled an operated, the emergence of dynamic system requiring the specification of the number of new solutions to address fast emerging requirements. Accordingly, in some embodiments, routing process 244 may be configured to support deterministic technologies such as Deterministic Ethernet or Deterministic Wireless. Generally, these technologies use time scheduling, to ensure that all nodes of a given path are synchronized. The Network Time Protocol (NTP) and Precision Time Protocol (PTP) are example protocols that may be used to synchronize the local timing mechanisms of the nodes. Forwarding of each packet is then regulated by the synchronized time schedule, which specifies when a given packet has to be transmitted. Generally, this time period is referred to as a timeslot. In some implementations, an external agent (e.g., a PCE, etc.), sometimes referred to as a orchestrator, may be configured to compute the path and associated timetables for the path. The computed path and timetable are then downloaded onto every node along the path which, in turn, transmits packets along the path according to the computed time schedule.

An example routing protocol that may be used by routing process 244 for LLNs is specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), which provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012). Further, an example OF (e.g., a default OF) may be found in an IETF RFC, entitled "RPL Objective Function 0" <RFC 6552> by Thubert (March 2012) and "The Minimum Rank Objective Function with Hysteresis" <RFC 6719> by O. Gnawali et al. (September 2012).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
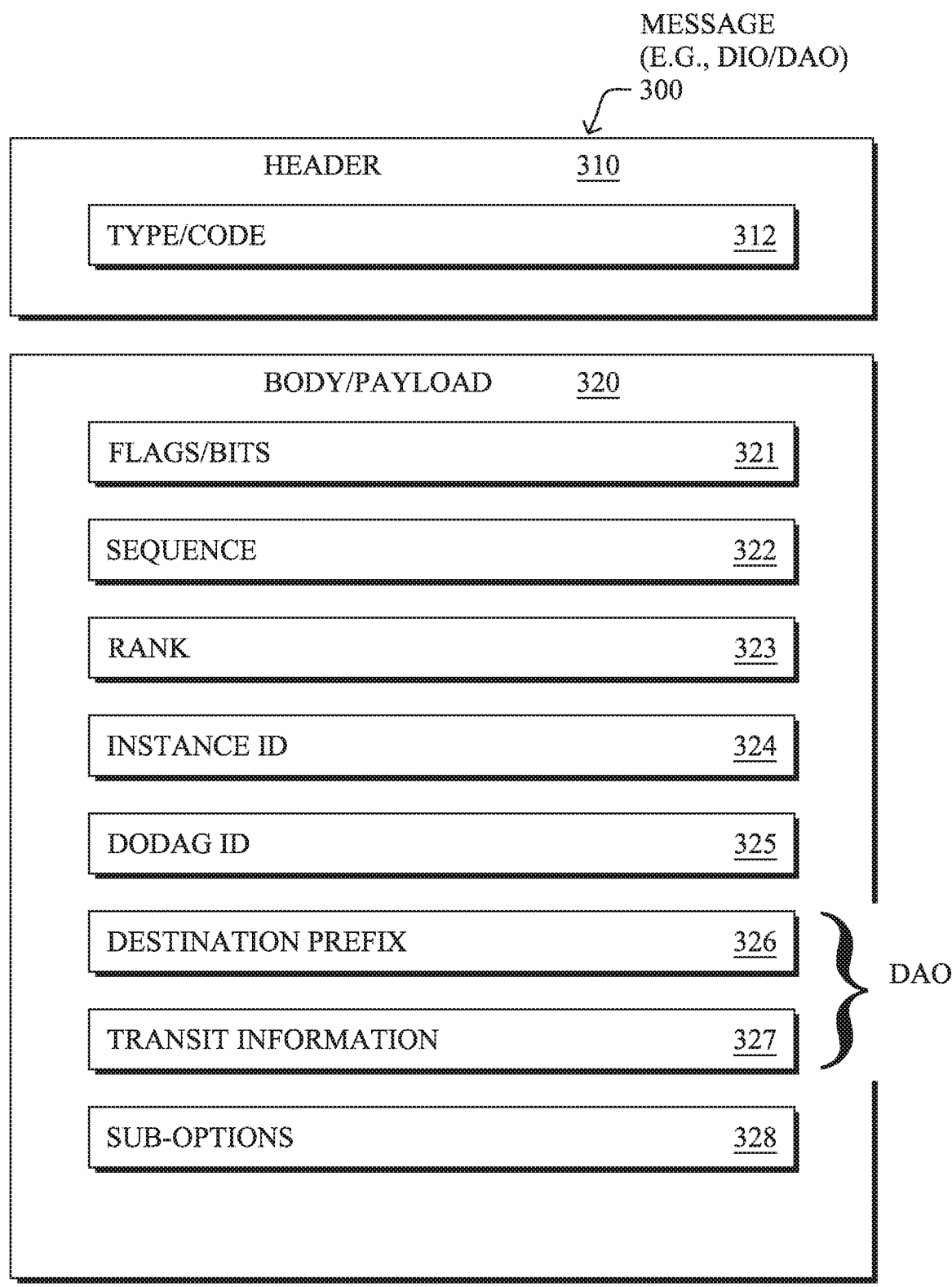
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
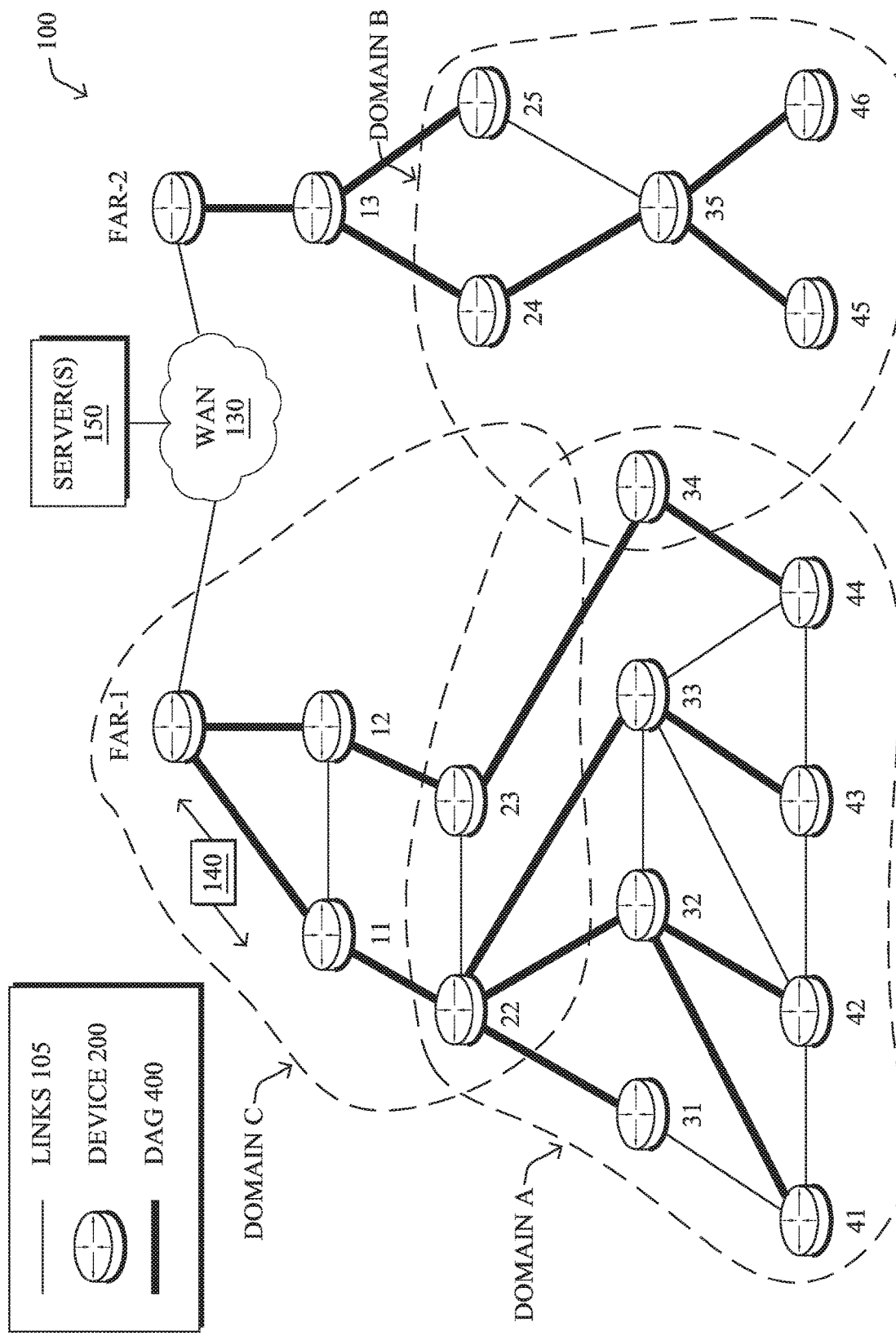
FIG. 4 illustrates an example directed acyclic graph (DAG) in the communication network of FIG. 1.

FIG. 4 illustrates an example simplified DAG 400 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 400 (shown as bolded lines), which extends from the root node toward one or more leaf nodes (nodes without children). Traffic/packets 140 (shown in FIG. 1) may then traverse the DAG 400 in either the upward direction toward the root or downward toward the leaf nodes, particularly as described herein.

According to various embodiments, communications within network 100 may be deterministic. Notably, low power wireless industrial process control typically uses 1 Hz to 4 Hz control loops, and for those, a scheduled media access control (MAC) protocol can be considered deterministic, even when clocks drift in the order of tens of parts per million (ppm). A low-throughput technology such as IEEE802.15.4 may thus be adapted to support determinism. In particular, the bandwidth can be pre-formatted in a time division multiplexing (TDM) fashion using IEEE802.15.4, and timeslots become a unit of throughput that can allocated to a deterministic flow, without incurring a huge consumption of system resources. In other implementations of a time sensitive network, individual timers may be used by the networked devices instead of TDM. Such timers may elapse at the time of a deterministic transmission, so as to reserve the medium for that transmission, leaving the medium free for best effort routing the rest of the time.

Routing in a deterministic network can be operated either in a centralized or in a distributed fashion, but only the centralized routing operation can guarantee the overall optimization for all the flows with a given set of constraints and goals. An example architecture to support such a technique may be found in the IETF draft entitled "An Architecture for IPv6 over the TSCH mode of IEEE 802.15.4e" by Thubert et al. (February 2014), and referred to herein as "6TiSCH." The centralized computation is typically done by a PCE with an objective function that represents the goals and constraints. A PCE may compute not only an optimized Layer 3 path for purposes of traffic engineering, but also to compute timeslots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough timeslots for retransmissions).

For distributed routing, 6TiSCH relies on the RPL routing protocol (RFC6550). The design of RPL also includes the capability to build routing topologies (e.g., "instances" in RPL parlance) that are associated with objective functions, but in a distributed fashion. With RPL, the routing operations will be more efficient (e.g., with no need of CPU intensive PCE computations) and resilient (e.g., with no dependence on a PCE for base routing and recovery).

Of note is that scheduling is not a part of RPL and may be designed for the distributed routing scheme. Although it is not possible to guarantee that an individual path is fully optimized, or that the distribution of resources is globally optimized, it may be possible to impose deterministic behavior along a routing path (e.g., an ultra-low jitter, controlled latency, etc.).

For the underlying MAC operation, 6TiSCH relies, as its name shows, on timeslotted channel hopping (TSCH). More specifically, 6TiSCH is being designed for the IEEE802.15.4e TSCH mode of operation. This is the standardized version of the MAC that was adopted by all industrial WSN standards, ISA100.11a, WirelessHART and WIAPA.

The timeslotted aspect of the TSCH technology is a time division multiplexing (TDM) technique, which requires all nodes in the network to be time synchronized. In other words, time is sliced up into timeslots with a given timeslot being long enough for a MAC frame of maximum size to be sent from mote B to node A, and for node A to reply with an acknowledgment (ACK) frame indicating successful reception.

TSCH is different from traditional low-power MAC protocols because of its scheduled nature. In TSCH, all nodes in the network follow a common communication schedule, which indicates for each active (e.g., transmit or receive) timeslot a channel offset and the address of the neighbor to communicate with. The channel offset is translated into a frequency using a specific translation function which causes pairs of neighbors to "hop" between the different available channels (e.g., frequencies) when communicating. Such channel hopping technique efficiently combats multi-path fading and external interference. Notably, since 6TiSCH is based on TSCH, 6TiSCH also uses the basic TSCH concepts of a schedule and timeslots. However, since 6TiSCH may extend over several interference domains with distributed routing and scheduling, there is no longer the concept of a single schedule that would centralize all the transmissions and receptions. In particular, with 6TiSCH, some TSCH concepts may still apply globally and their configurations must be shared by all nodes in the network, but other concepts may be local to a given node in 6TiSCH. For example, the hopping schedule in 6TiSCH may represent only the transmission to which a particular node is participating.

Figure 5:
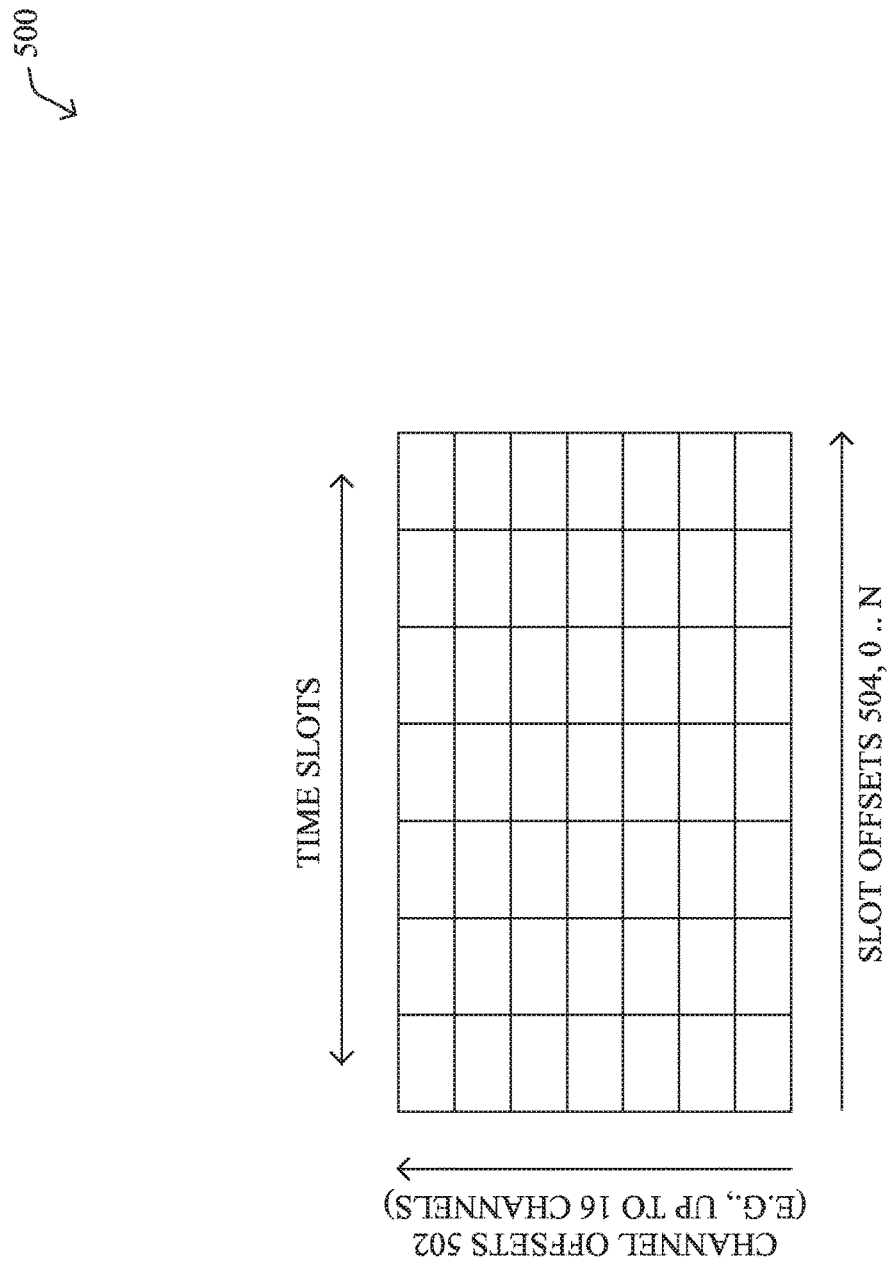
FIG. 5 illustrates an example channel distribution/usage (CDU) matrix.

Referring now to FIG. 5, an example channel distribution/usage (CDU) matrix 500 is shown that may be used by the nodes/devices 200 in network 100. Notably, 6TiSCH defines a new global concept of a CDU matrix that may repeat itself over time and represents the global characteristics of the network such as used/unused channels, timeslot durations, number of timeslots per iteration, etc. As shown, CDU matrix 500 may include an index of channel offsets 502 along a first axis that correspond to the channels available for use in network 100 (e.g., offsets for each of sixteen available channels). As would be appreciated, any number of channels may be used in the network. Along the other axis are slot offsets 504 that correspond to differing timeslots, the combination of which is equal to one period of the network scheduling operation.

CDU matrix 500 may be used to define the basic wireless communication operations for the network. For example, CDU matrix 500 may be used to define the duration of a timeslot (e.g., between 10 to 15 ms), the period of an iteration (e.g., the total number of timeslots, indexed by slot offsets 504), and the number of channels (e.g., indexed by channel offset 502) to which the MAC may jump.

A "cell" in CDU matrix 500 is defined by the pair (slot offset, channel offset) in the epochal description of CDU matrix 500, in other words, at time t=0. During runtime, the actual channel at which a given transmission happens may be rotated to avoid interferences such as self-inflicted multipath fading.

Figure 6:
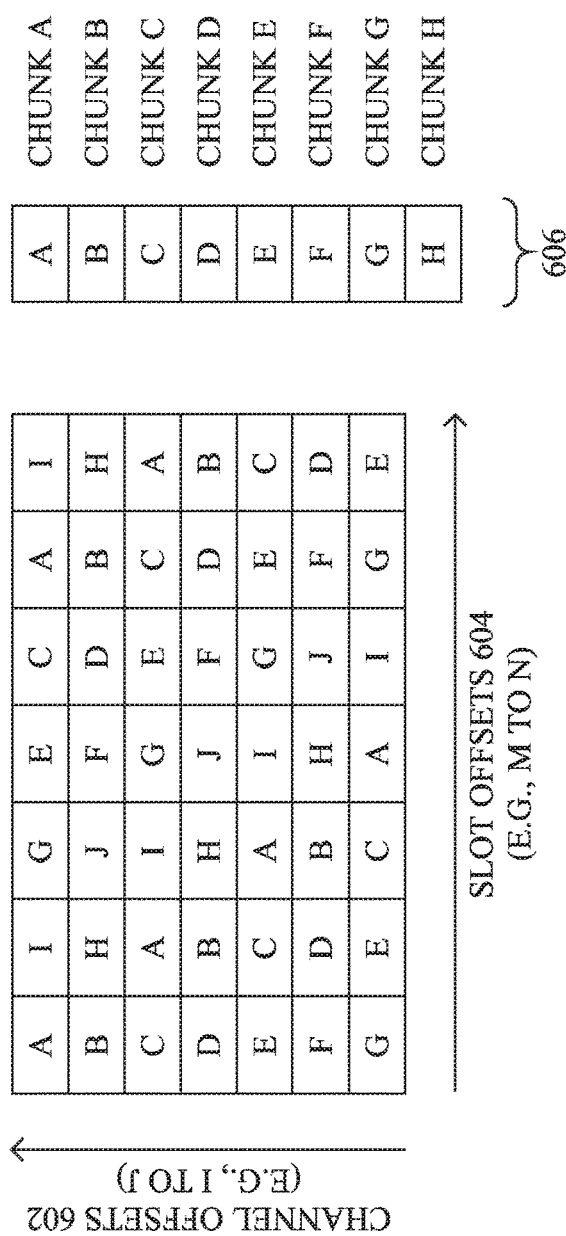
FIG. 6 illustrates example chunks of the CDU matrix of FIG. 5.

Referring now to FIG. 6, an example subset 600 of CDU matrix 500 is shown to be divided into chunks 606. In order to scale the network, the computation of the channel hopping schedule for the network may be distributed. According to some embodiments, such as those in which 6TiSCH is used, a parent node (e.g., an RPL parent) may be responsible for computing the schedule between the parent and its child node(s) in both directions. In order to allocate a cell for a given transmission, the parent node must be certain that this cell will not be used by another parent in the interference domain. As shown, for example, cells within CDU matrix 500 may be "owned" by different parent nodes within the network. The collective cells of CDU matrix 500 assigned to different parent nodes may then be grouped together as chunks 606. In one implementation, for example, CDU matrix 500 may be formatted into chunks by making a full partition of matrix 500. The resulting partition must be well known by all the nodes in the network, to support the appropriation process, which would rely on a negotiation between nodes within an interference domain.

Typically, there will be at most one cell in a chunk per column of CDU matrix 500, to reflect that a device with a single radio may not use two channels at the same time. The cells may also be well distributed in time and frequency, so as to limit the gaps between transmissions and avoid the sequential loss of frames in multipath fading due to the consecutive reuse of a same channel.

Chunks 606 may be defined at the epochal time (e.g., at the time of creation of CDU matrix 500) and the 802.15.4e operation may be repeated iteratively any number of times. Typically, the effective channel for a given transmission may be incremented by a constant that is prime with the number of channels, modulo the number of channels at each iteration. As a result, the channel of a given transmission changes at each iteration and the matrix virtually rotates.

Figure 7:
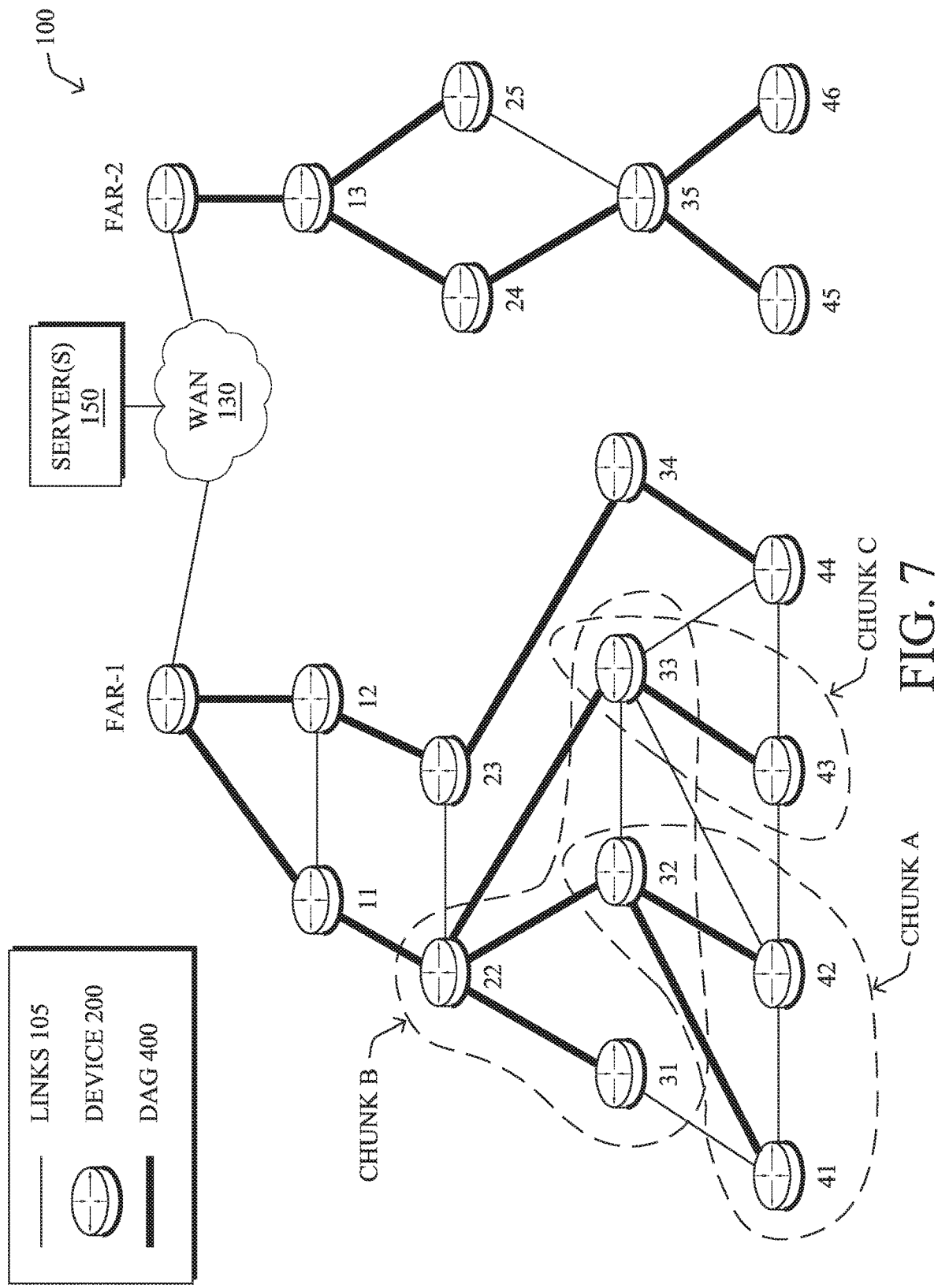
FIGS. 7-8 illustrate examples of a parent node in the network of FIG. 1 scheduling communications for a particular chunk.
Figure 8:
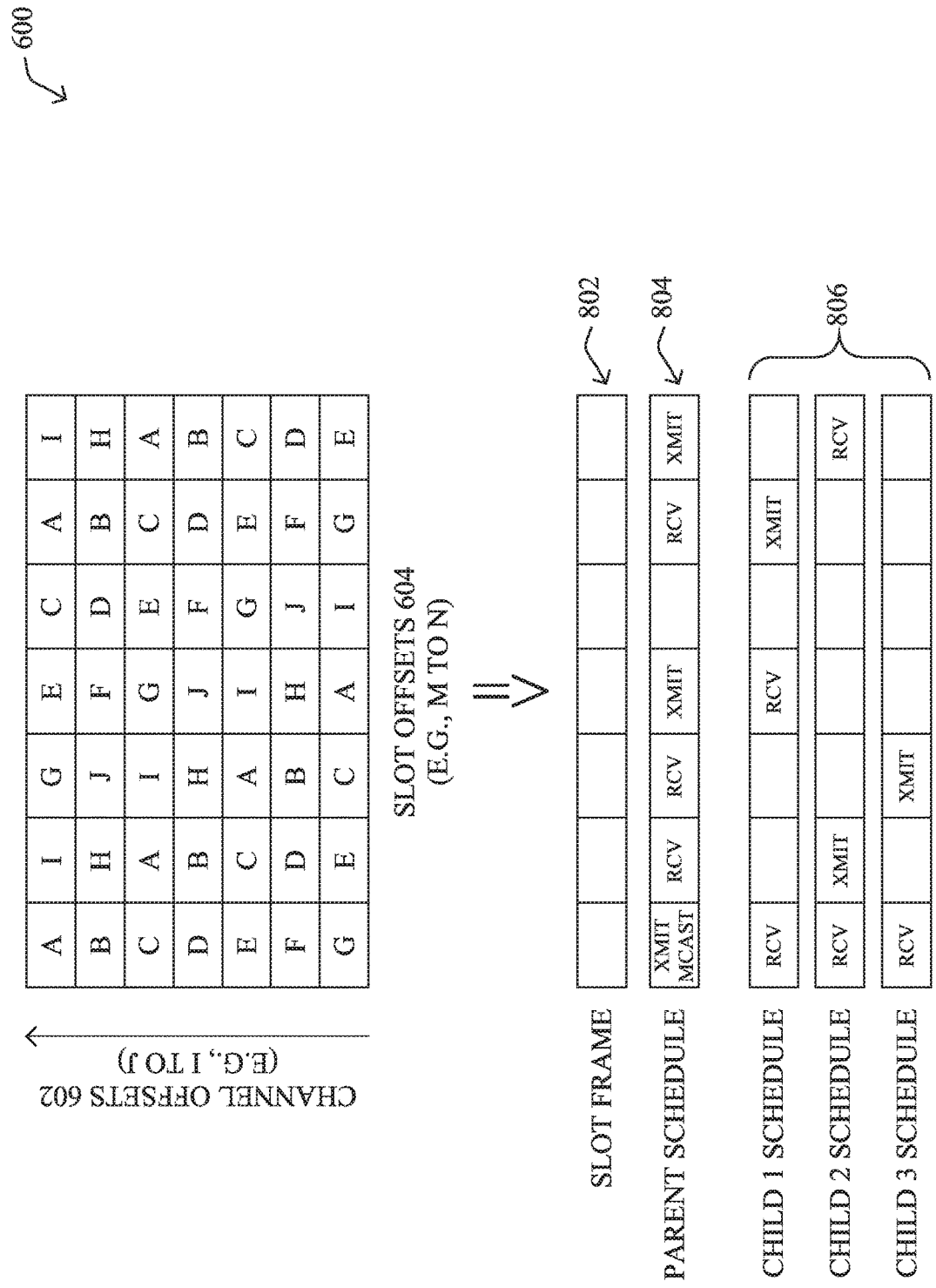

FIGS. 7-8 illustrate examples of a parent node in the network of FIG. 1 scheduling communications for a particular chunk. As shown, assume that node 32 is the parent node of child nodes 41, 42 according to the routing protocol. Node 32 may be assigned a chunk (e.g., chunk A) of CDU matrix 500, thereby allowing node 32 to manage the usage of the corresponding cells in the chunk within its interference domain. Thus, node 32 may decide which transmissions will occur over the cells in the chunk between itself and its child node(s). Ultimately, a chunk represents some amount of bandwidth and can be seen as the generalization in the time/frequency domain of the classical channel that is used to paint a wireless connectivity graph, e.g. to distribute TV frequencies over a country or Wi-Fi channels in an ESS deployment.

If chunks are designed to form a partition of the CDU matrix 500, multiple different chunks may be in use in the same area of network 100 and under the control of different parents. In one embodiment, the appropriation process may be such that any given node that communicates using cells in a given chunk, as appropriated and managed by a parent A, should not be within the interference domain of any other node that is also communicating using the same chunk but appropriated and managed by a different parent B. Consequently, the number of parents in any given area of the network may be constrained by the number of chunks.

Referring more specifically to FIG. 8, parent node 32 may use a slot frame 802 to assign hopping schedules 804, 806 to itself and any of its child node(s), respectively. Generally speaking, slot frame 802 is a MAC-level abstraction that is also internal to the node and includes a series of timeslots of equal length and priority. For example, the size of the slot frame 802 may match the CDU matrix 500. Parent node 32 may use slot frame 802 to divide the corresponding times into slots and associate the slots to a particular operation (e.g., reception, transmission, multicast operation, etc.). For example, as shown, parent node 32 and one of its child nodes may be synchronized to use the same channel during a given timeslot.

Slot frame 802 may be characterized by a slotframe_ID, a slot duration, and a slotframe_size. In some implementations, multiple slot frames may coexist in a node's schedule. In other words, a node can have multiple activities scheduled in different slot frames, based on the priority of its packets/traffic flows. The different slot frames may be implemented as having the same durations/sizes or different durations/sizes, in various cases. The timeslots in the slot frame may also be indexed by the slot offsets 604 (e.g., the first timeslot in slot frame 802 may be indexed as slot offset 0, etc.).

In various implementations, different parent nodes may appropriate different chunks such that the chunks used throughout the network do not interfere. For example, chunks may be appropriated by different parent nodes such that, for a given chunk, the domains do not intersect. In addition, the domains for different chunks are generally not congruent since the chunks are owned by different nodes. As a result, the schedule in a node with a single radio is a series of transmissions, and the parent to child cells are taken from (one of) the chunk(s) that the parent has appropriated.

6TiSCH also defines the peer-wise concept of a "bundle," that is needed for the communication between adjacent nodes. In general, a bundle is a group of equivalent scheduled cells (e.g., cells identified by different slot offset/channel offset pairs), which are scheduled for a same purpose, with the same neighbor, with the same flags, and the same slot frame. The size of the bundle refers to the number of cells it includes. Given the length of the slot frame, the size of the bundle also translates directly into bandwidth, either logical or physical. Ultimately a bundle represents a half-duplex link between nodes, one transmitter and one or more receivers, with a bandwidth that amount to the sum of the timeslots in the bundle. Adding a timeslot in a bundle increases the bandwidth of the link.

Track forwarding is the simplest and fastest forwarding model defined in the 6TiSCH architecture that specifies IPv6 over TSCH. In general, a "track" is defined as an end-to-end succession of timeslots, with a particular timeslot belonging to at most one track. In this model, a set of input cells (timeslots) are uniquely bound to a set of output cells, representing a forwarding state that can be used regardless of the upper layer protocol. In other words, a 6TiSCH track may represent a given path in a network, with the successive cells/timeslots of the track representing the send and receive times of the nodes along the path. This model can effectively be seen as a G-MPLS operation in that the information used to switch is not an explicit label, but rather related to other properties of the way the packet was received, a particular cell in the case of 6TiSCH. As a result, as long as the TSCH MAC (and Layer 2 security) accepts a frame, that frame can be switched regardless of the protocol, whether this is an IPv6 packet, a 6LoWPAN fragment, or a frame from an alternate protocol such as WirelessHART of ISA100.11a.

For a given iteration of a slotframe, the timeslot is associated uniquely with a cell, which indicates the channel at which the timeslot operates for that iteration. A data frame that is forwarded along a track has a destination MAC address set to broadcast or a multicast address depending on MAC support. This way, the MAC layer in the intermediate nodes accepts the incoming frame and the 6top sublayer switches it without incurring a change in the MAC header. In the case of IEEE802.15.4e, this means effectively broadcast, so that along the track the short address for the destination is set to broadcast, 0xFFFF. Conversely, a frame that is received along a track with a destination MAC address set to this node is extracted from the track stream and delivered to the upper layer. A frame with an unrecognized MAC address may be ignored at the MAC layer and thus is not received at the 6top sublayer.

As noted above, there has been recent interest in extending sensor networks to also support automation (e.g., control loops). In many cases, this means enabling a deterministic networking path over a multi-hop, wireless mesh network, on operation that typically involves a network controller. However, many mesh networks are low-speed and have a large number of hops along any given path (e.g., 20+ in many cases). For these reasons, it is not possible for the routing mechanism to set a serial path of hops (e.g., A→B→C→D) at each hop, whenever the wireless medium fluctuates.

To address this, in some embodiments, the routing mechanism may compute highly redundant paths, called tracks in 6TiSCH, between a source node/device and a destination node/device. Doing so would still be within the DetNet PREOF model, but the limit is that DetNet does not influence the forwarding time. Thus, the tracks would effectively be flooded for each packet of a flow, making all replication points active at all times. However, both energy and wireless spectrum are constrained resources, in most sensor network. This true even more so in the case of deterministic networking, as the deterministic flows push back on all other traffic.

Figure 9:
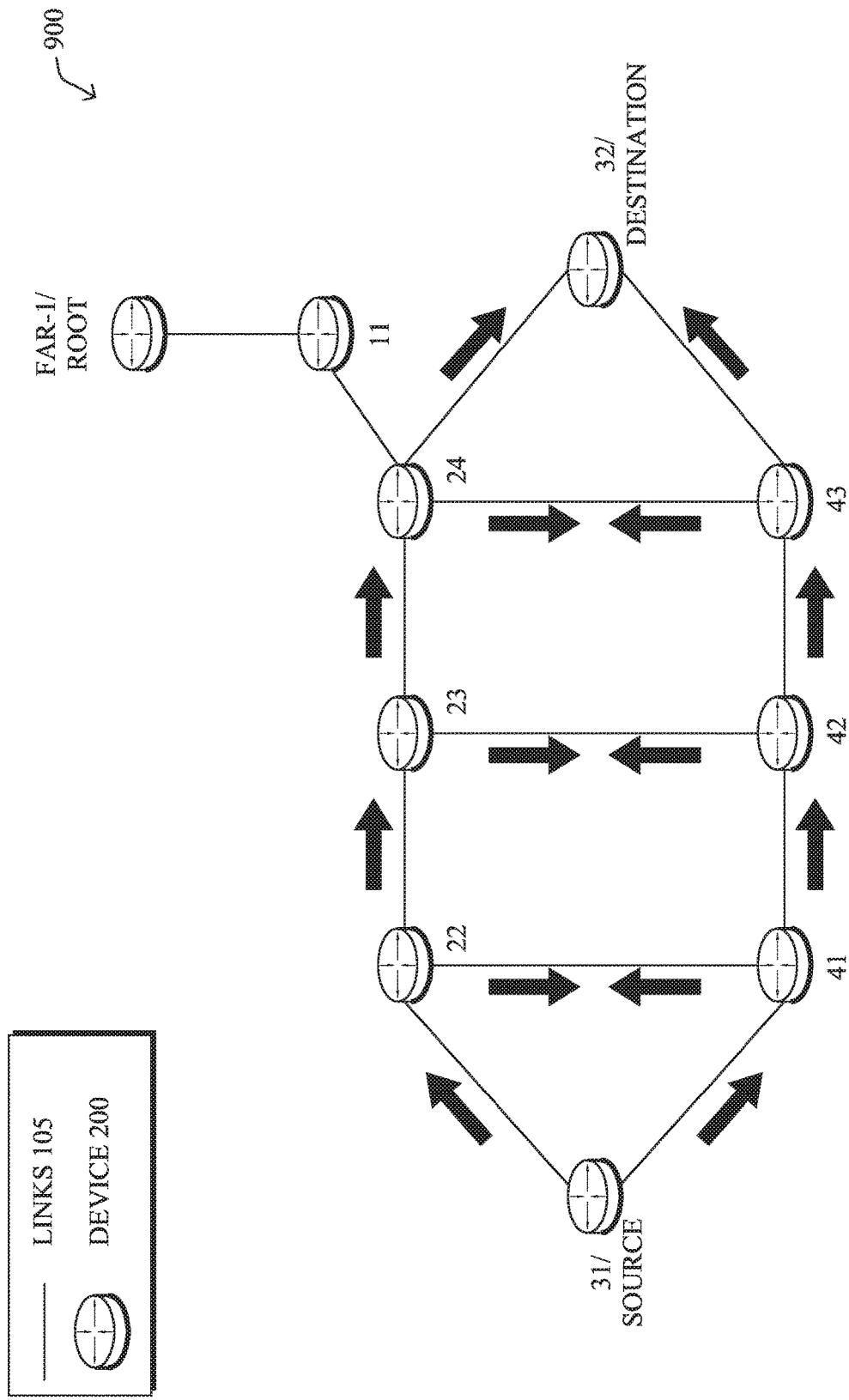
FIG. 9 illustrates an example of the possible paths between a source node and a destination node in a mesh network.

FIG. 9 illustrates an example of routing packets from a source to a destination in a mesh network, using the above approach. As shown, assume that the mesh network 900 includes FAR-1 and nodes 11, 22, 23, 24, 31, 32, 41, 42, and 43. During operation, FAR-1 may act as a RPL root node for network 900 and that node 31 is to act as a data source that sends packets to its destination, node 32.

An extension to RPL was recently introduced in the IETF draft entitled, "Root Initiated Routing State in RPL," by Thubert, et al. Traditionally, routes in RPL are centrally-computed and injected by the end devices. This allows for source routing down a DODAG, in non-storing mode, or transversal routes within the DODAG. However, using the extension to RPL proposed in the draft, the DODAG root, such as FAR-1, can project the routes directly onto the nodes at locations needing the routes.

The main problem with the above approach is that flooding the track with all replicated packets and retried on all scheduled opportunities consumes both power and wireless spectrum, which are both critical resources in many wireless LLNs, as shown in FIG. 9. Accordingly, new mechanisms are needed that address the less consistent transmissions in LLNs, energy conservation, and shared spectrum efficiency. In other words, any new solution must include the following:

An end-to-end routing function that computes a complex network path (e.g., a 6TiSCH track) with a high degree of redundancy and diversity, leveraging DetNet PREOF, end-to-end network coding, and/or radio-specific abstracted techniques such as Automatic Repeat request (ARQ), overhearing, frequency diversity, time slotting, and possibly others. The overall goal of the routing function is to optimize the use of the path/track at the forwarding timescale, to maintain the expected service while optimizing the usage of constrained resources, such as energy and spectrum.

Another prerequisite is that an IP link can be established over the radio with some guarantees in terms of service reliability, e.g., it can be relied upon to transmit a packet within a bounded latency and provides a guaranteed bit error rate (BER) and/or packet delivery rate (PDR) outside of rare, transient outage windows that can last from split seconds to minutes. The radio layer can be programmed with abstract parameters, and can return an abstract view of the state of the link to help forwarding decision.

The end-to-end routing can be centralized and can reside outside the network. Note that the routing computation can be comparatively slow with respect to the events that affect the forwarding operation at the radio layer. Due to the cost and latency to perform a route computation, routing is not expected to be sensitive/reactive to transient changes. The abstraction of a link at the routing level can use, for example, statistical operational metrics that aggregate the behavior of a link over long periods of time, and represent its availability as a 'shade of gray,' as opposed to either up or down.

The whole path/track can be observed in quasi-real time. This can be achieved, for example, using mechanisms such as L2-triggers. Dynamic Link Exchange Protocol (DLEP) mechanisms, Bidirectional Forwarding Detection (BFD), inband-OAM signaling, or the like, as well as BIER-TE, SR, or the like, to control the use of the path/track on individual packets.

Decisions may also be made at the ingress and signaled in-band. Alternatively, they may be made at intermediate hops and depend on the current state of the next hop and local policies. In either case, a per-flow state is installed in all intermediate nodes to recognize the flow and determine the forwarding policy to be applied.

Currently, there is no known approach to the distributed optimization problem whereby each node/device in the network is capable of redundant operations, such as packet replication, retry, or overhearing, and individually deciding whether to spend critical resources on that redundant operation.

Reverse OAM Signaling in a Mesh Network

The techniques introduced herein allow for deterministic networking to be implemented in a mesh network that significantly reduce the resources consumed by the devices/nodes in the network. In some aspects, the techniques herein propose the use of a partial directed acyclic graph (PDAG), which is a generalization of a deterministic networking path and/or 6TiSCH track. To limit the resource consumption, in some embodiments, the decision to apply redundancy to a transmission (e.g., replication or retry) is made in a distributed manner at each node along a source-destination oriented DAG (SDO-PDAG) by leveraging unscheduled OAM signaling along the reverse SDO-PDAG. In further aspects, the forwarding along an SDO-PDAG may also be performed in a manner that provides a delivered copies per packet (DCPP) that is lower than the maximum that the routing mechanism could provide, in order to help reduce the resources consumed by redundant transmissions.

Specifically, according to one or more embodiments of the disclosure as described in detail below, a device in a mesh network joins a SDO-PDAG between a source node and a destination node in the network. The device receives OAM packets flooded along reverse paths of the SDO-PDAG. The device determines, based on the received OAM packets, packet drop rate (PDR) capacities of different paths between the device and the destination node. The device replicates a data packet sent from the source node to the destination node along two or more of the paths between the device and the destination node, based on the determined PDR capacities of those paths.

Illustratively, the techniques described herein may be performed by hardware, software, and/or firmware, such as in accordance with the OAM signaling process 248, which may include computer executable instructions executed by the processor 220 (or independent processor of interfaces 210) to perform functions relating to the techniques described herein, e.g., in conjunction with routing process 244.

Operationally, the techniques herein introduce the concept of a partially-directed acyclic graph (PDAG) in a network whereby not all links between nodes/devices in the PDAG are oriented and that the PDAG is maintained loopless by an additional simple forwarding rule that prevents a node from sending a packet back on the link from which it was received.

Figure 10:
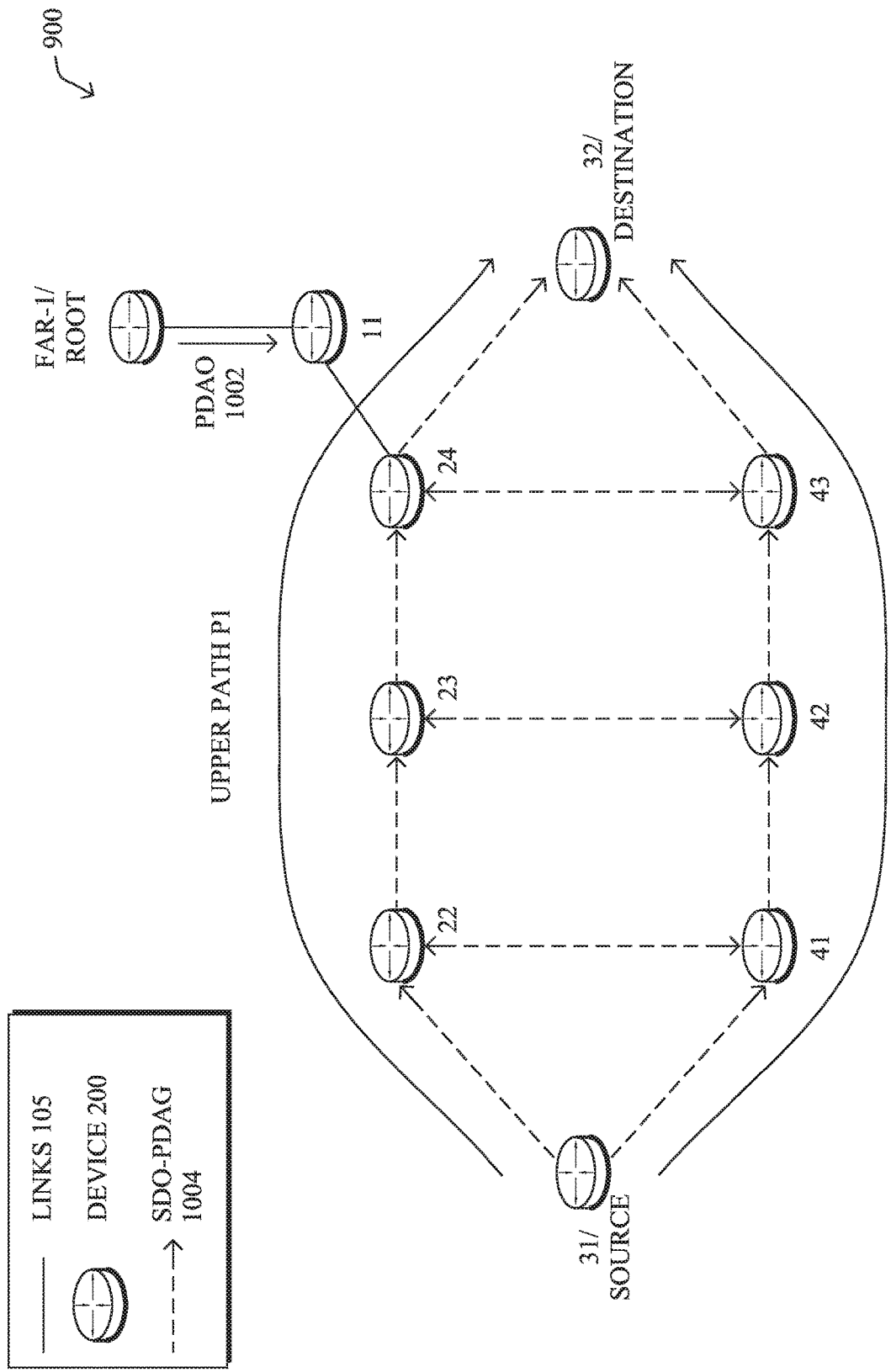
FIG. 10 illustrates an example of the formation of a source-destination oriented partial directed acyclic graph (SDO-PDAG) in a network.

FIG. 10 illustrates an example of the formation of a PDAG within network 900, according to various embodiments. More specifically, consider again the case of network 900 in which node 31 is a source of packets that are destined for node 32. In such a case, a specialized form of a PDAG, referred to herein as a Source-Destination Oriented (SDO-PDAG), may be formed in network 900 to support communications between source node 31 and destination node 32.

The formed SDO-PDAG 1004 has the following properties:
- A single source (e.g., a node with only outgoing links 105)
- A single destination (e.g., a node with only incoming links 105)
- At least some links 105 that are not oriented. For example, links 105 between nodes 22-41, 22-42, and 24-43 may be bidirectional, as shown.
- Forwarding rules that prevent loops when sending packets from source node 31 to destination node 32.

According to various embodiments, reversing all of the links/paths of SDO-PDAG 1004 will also result in another SDO-PDAG in which the source and destination roles are inverted. For example, in the reverse of SDO-PDAG 1004, node 32 may act as the source node and node 31 may act as the destination node, with the oriented links of SDO-PDAG 1004 reversed (e.g., from node 32 towards node 24, from node 32 towards node 43, etc.).

As noted previously, redundancy in LLNs can lead to excessive resource consumption that can reduce the battery life of a node, consume wireless spectrum, etc. To help conserve network resources, the concept of redundancy load is also introduced herein. For example, if a given packet sent from source node 31 towards destination node 32 is duplicated along the way by node 41, the packet will arrive twice at destination node 32 under best-case circumstances. Thus, in this case, the redundancy load is 2. Similarly, the concept of hop resistance is also introduced herein that attempts to also take into account the chance of packet failures. For example, the resistance of a given hop may be calculated as the log of the statistical chance that a transmission along that hop will fail.

Figure 11:
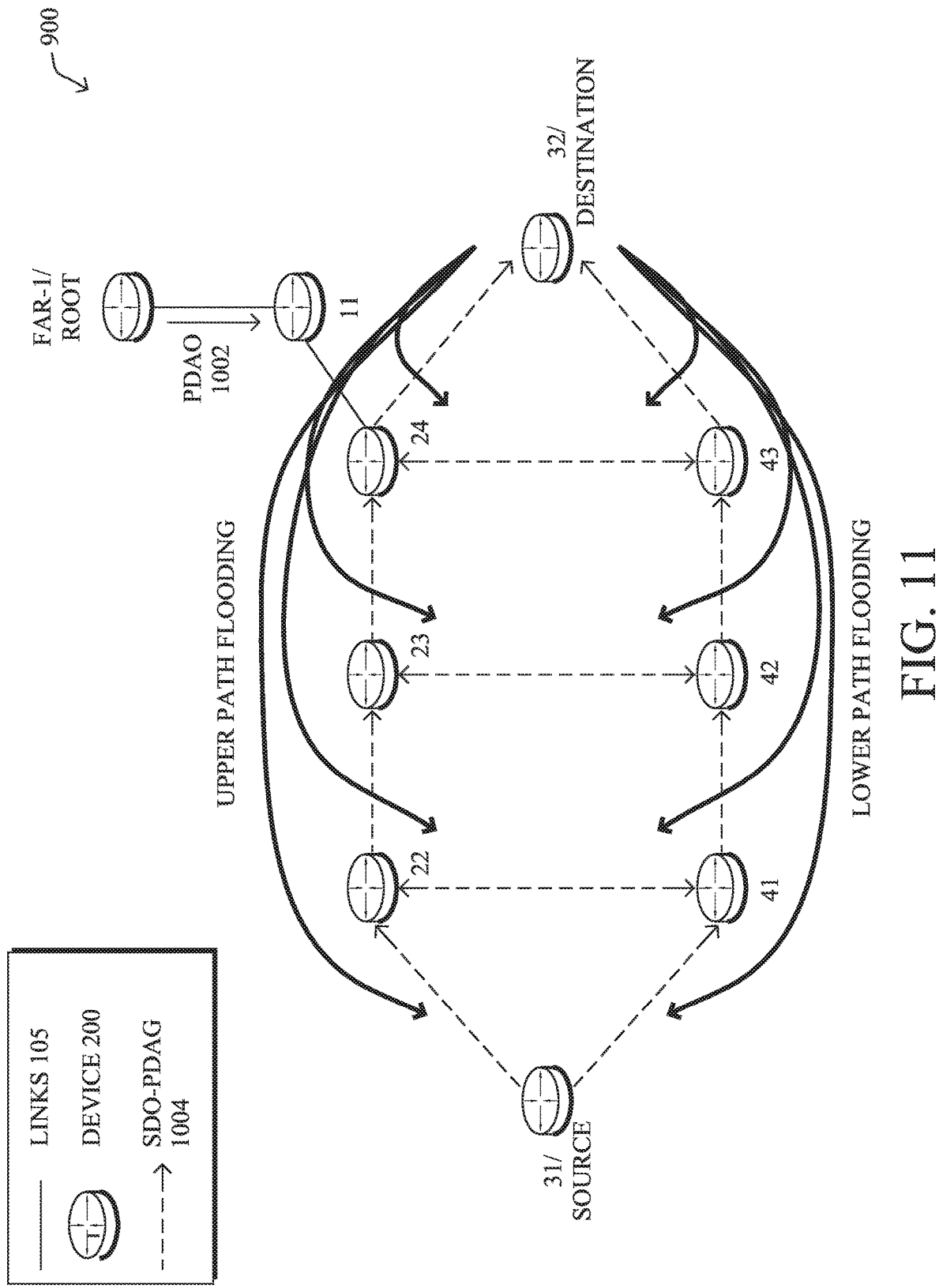
FIG. 11 illustrates an example of performing reverse operations, administration and maintenance (OAM) flooding in an SDO-PDAG.

The techniques herein allow for redundancy decisions (e.g., packet replication or retry) to be performed in a distributed manner and at each node along a scheduled SDO-PDAG by leveraging unscheduled OAM transmissions on the reverse SDO-PDAG. FIG. 11 illustrates an example of such OAM flooding along the reverse of SDO-PDAG 1004.

In some embodiments, a simple approach to the reverse OAM flooding would be for the OAM packets to carry vectors that are concatenated as they traverse the reverse SDO-PDAG using non-deterministic transmission. In other words, while the flows along SDO-PDAG 1004 from source node 31 to destination node 32 may be deterministic, the OAM flooding along the reverse paths of SDO-PDAG 1004 may be non-deterministic. Each vector then includes information on a single hop traversed by the OAM packet. This OAM signaling allows each intermediate node to estimate the amount of redundancy that is available to destination node 32, as well as the maximum number of packets that will reach destination node 32 if all forms of diversity is applied and without packet elimination.

While the above approach may be suitable for some circumstances, it also creates a combinatory explosion of OAM packets. If the OAM packets are sent at a frequency that is much lower than that of the data packets, as is typically the case, this alone may not be problematic. For example, as the OAM packets are non-deterministic, they can leverage the gaps in the bandwidth reserved for the deterministic data packets. Overall, the OAM signaling gives each intermediate node along the SDO-PDAG a complete view of the rest of the way to the destination node and allowing that node to compute the statistical chance of success were the node to simply forward the packet on to the next hop versus replicating the packet.

An improved approach to the above OAM flooding mechanism is shown in FIG. 11. First, the PCE performing the routing computation (e.g., the root node, another remote device, etc.) computes non-congruent paths along the SDO-PDAG, as well as the replication/elimination bridging paths that can be reversible. For example, the Root node in network 900 may compute a first, 'upper' path that includes nodes 32, 24, 23, 22, and 31 and another, non-congruent 'lower' path that includes nodes 32, 43, 42, 41, and 31. Additionally, the Root may also identify the paths between nodes 22-41, 23-42, and 24-43 as bridging paths between the upper and lower paths that can be reversible.

A P-DAO message, such as P-DAO 1002 can signal each of the paths, separately, and a correlation based on the local RPLinstanceID can be used to allow each of the nodes in SDO-PDAG 1004 to realize that that it is on the same track/path as the others. According to various embodiments, P-DAO 1002 can also be augmented to indicate whether a particular path in SDO-PDAG 1004 is an end-to-end path between nodes 31-32 or a replication/elimination bridging path. In the latter case, the additional signaling can also indicate bidirectionality, as well.

As shown, the OAM flooding may still be performed along the reverse paths of SDO-PDAG 1004, but may be limited to non-congruent paths and the replication/elimination bridging paths, according to further embodiments. For example, the OAM packets may be sent along the upper path shown, the lower path, as well as the bridging paths between nodes 22-41, 23-42, and 24-43. In other words, OAM flooding that traverses a designated bridging path will not be reinjected in the non-congruent path on the other side. For example, when node 41 receives an OAM packet from node 22, it will not forward the packet onward. This mechanism helps to limit the amount of OAM flooding along the reverse paths of SDO-PDAG 1004.

As opposed to the simple reverse OAM approach which requires information on each hop (e.g., link state information), the flooding can now include only a simple aggregated metric such as ETX over its traversed path. This is enough to allow an intermediary node to determine the chances of packet delivery to destination node 32 via the different paths available to the node via SDO-PDAG 1004.

In some embodiments, a node that discovers that the link to the next hop along its non-congruent path is broken may immediately inject an OAM packet back, so that prior nodes along the path can reroute data packets over the available bridging paths. In turn, when the source node receives the injected OAM packet, it may stop using the path until the path is restored. Conversely, when the hop is back in function, the intermediary node may generate a new OAM packet to resume the use of the non-congruent path.

Figure 12A:
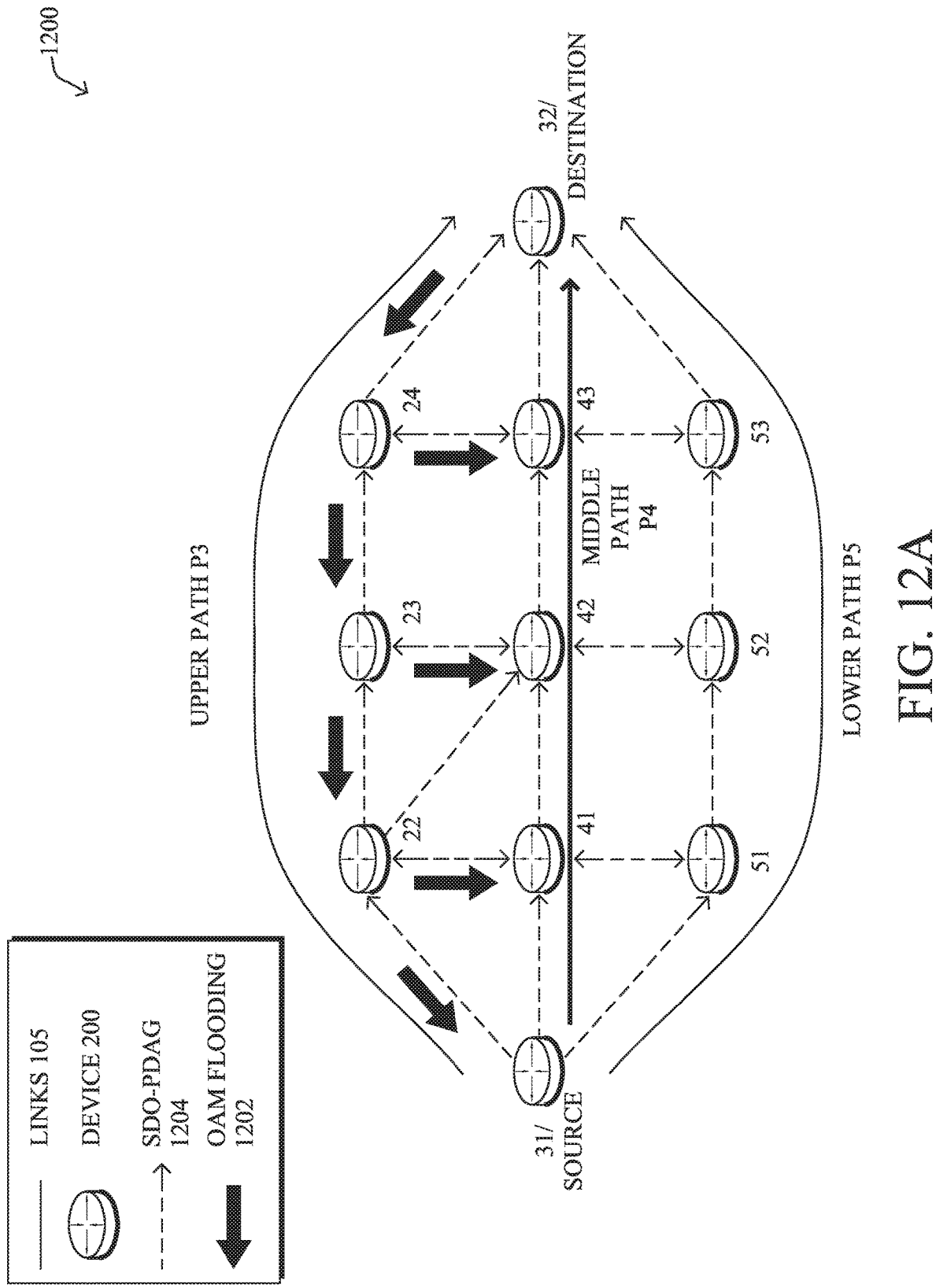
FIGS. 12A-12B illustrate examples of limiting the reverse OAM flooding in an SDO-PDAG.

While the above description is intentionally simplistic for illustrative purposes, there can also be more complex situations that involve even more non-congruent paths and/or directional bridging paths. For example, FIG. 12A illustrates an example network 1200 that comprises nodes 22, 23, 24, 31, 41, 42, 43, 32, 51, 52, and 53 that belong to SD-PDAG 1204 that connects source node 31 to destination node 32. In this case, there are three non-congruent paths: upper path P3 that comprises nodes 22, 23, and 24, a middle path P4 that comprises nodes 41, 42, 43, and a lower path P5 that comprises nodes 51, 52, and 53. In addition, SDO-PDAG 1204 may also include directed bridging paths. For example, the link between nodes 22 and 42 may be directed towards node 42.

Reverse OAM flooding in network 1200 can be achieved using the above flooding approaches. For example, destination node 32 may send OAM packets along the reverse of upper path P3, resulting in the OAM flooding 1202. Here, since the link between nodes 22 and 42 is directional, it is not flooded with the OAM packets flooded along upper path P3, as its direction is reversed in the reverse of SDO-PDAG 1204 for purposes of OAM flooding.

Figure 12B:
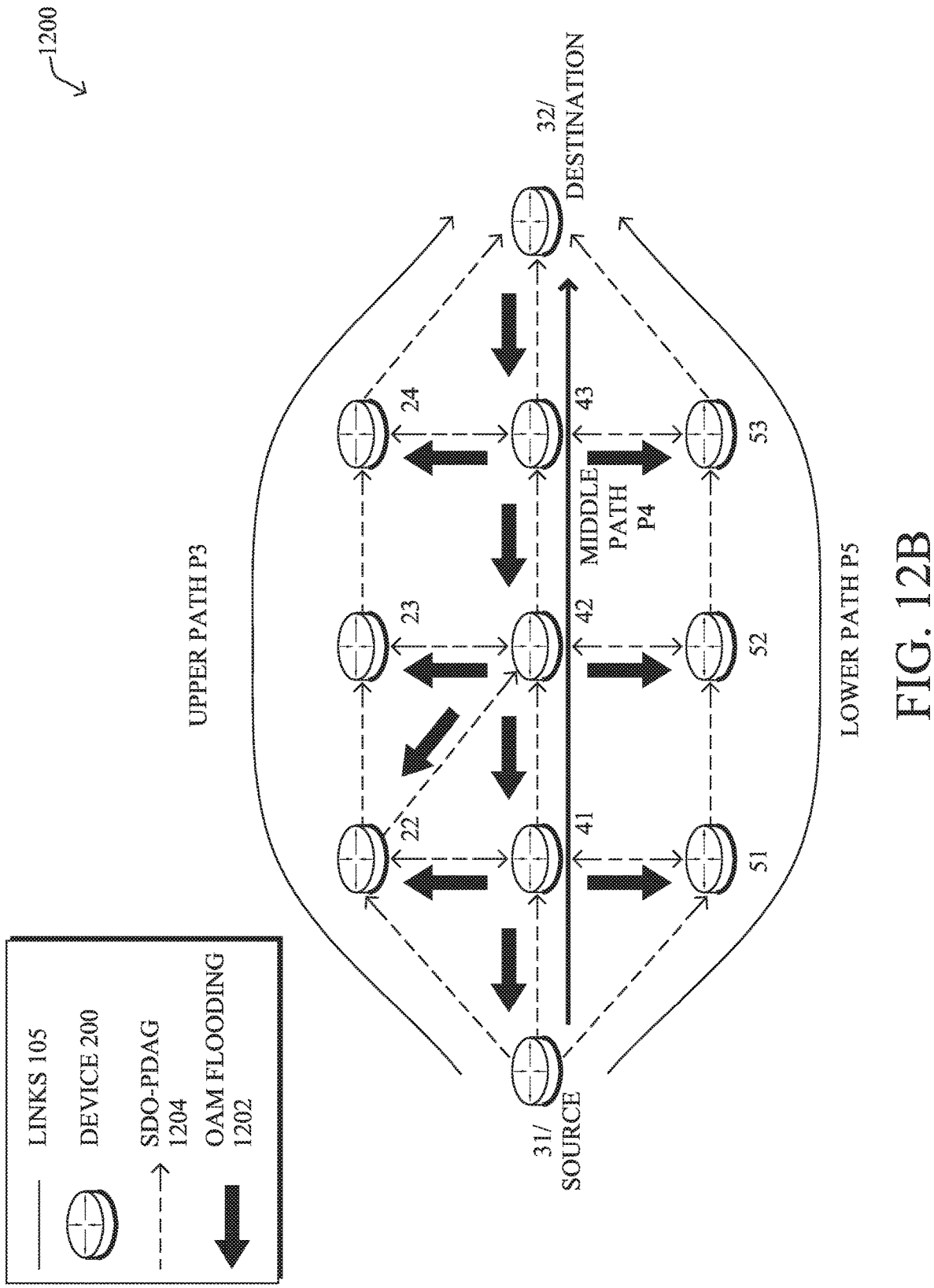

As shown in FIG. 12B, the OAM flooding 1202 of middle path P4 may similarly traverse the reverse of P4 and along the various bridging paths. Here, however, flooding 1202 may also traverse the link from node 42 to node 22, as the reverse direction of the link points towards node 22. This allows node 22 to obtain information about the path to destination node 32 that includes this link, as well.

As discussed previously, the techniques herein assume that routing computations are performed remotely by a PCE located at the root of the RPL network, or another device, over long periods of time in which the link metrics are statistically shades of gray and produces tracks with high degrees of redundancy. Referring again briefly to FIG. 10, if all of the redundancy possible is used, and all elimination points act as expected, it takes nineteen transmissions to send three packets all the way to destination node 32, assuming no retries are needed at any given hop. If the routing goal of the PCE is even more delivered copies per packet (DCPP), then it would have to build an SDO-PDAG with even more redundant paths or remove elimination points.

Since links 105 shown have 'shades of gray' packet delivery ratios (PDRs), the PCE will also not compute a DCPP of three, but a value that is actually less than three. For example, the PCE of the Root node may determine that the DCPP afforded by full redundancy in SDO-PDAG 1004 may have a value of 2.7. Thus, given a desired DCPP, the PCE may compute and install an SDO-PDAG that is expected to meet this requirement. For example, even if the DCPP of SDO-PDAG 1004 is 2.7, the PCE may install it, if the desired DCPP for packets sent from source node 31 to destination node 32 is 2.5. Once installed, it is then up to the forwarding nodes in SDO-PDAG 1004 to use the computed graph intelligently and limit the use of non-congruent end-to-end paths and of the bridging paths, in order to conserve resources.

Using the reverse OAM signaling introduced above, each intermediate node along the non-congruent, end-to-end paths can now evaluate the quality of the remainder of the path to the destination node. More specifically, in various embodiments, each node can determine the availability of the remainder of the path(s) to the destination and/or the statistical likelihood of a packet reaching the destination across the combination of the current end-to-end path and any adjacent end-to-end paths that are reachable via the bridging paths.

According to further embodiments, data packets in the deterministic flows between the source node and the destination node can also be instrumented with additional information, so that each intermediate node can independently decide whether to leverage packet replication. More specifically, the forwarding mechanism may be given a task, set by policy, to use the SDO-PDAG in a fashion that provides a DCPP that is lower than the maximum achievable by the routing mechanism (e.g., a forwarding DCPP of 1.3 and a routing DCPP of 2.5).

FIGS. 13A-13F illustrate examples of the operations of the intermediate nodes in an SDO-PDAG, according to various embodiments. As shown in FIG. 13A, consider again network 1200 in which SDO-PDAG 1204 was installed between source node 31 and destination node 32. In various embodiments, when source 31 is to send a data packet 1302 towards destination node 32, it may select one or more paths to use in SDO-PDAG 1204 based on the estimated PDR (ePDR) to destination node 32 for each path. Such an estimation becomes possible thanks to the reverse OAM flooding performed with respect to SDO-PDAG 1204.

For example, assume that middle path P4 has an ePDR=0.9, upper path P3 has an ePDR=0.6, and lower path P5 has an ePDR=0.7. Further, assume that the goal of source node 31 is to send the data packet 1302 to destination node 32 with a DCPP of 1.3. Considering this goal and the amount of energy consumed along each path, the forwarding operation at source node 31 may decide to use middle path P4 and lower path P5. This gives a maximum DCPP of 0.9+0.7=1.6, which provides some margin with respect to the guaranteed DCPP goal of 1.3.

According to various embodiments, each data packet sent by the source node towards the destination node may be tagged with the desired PDR (dPDR) along the remainder of the path. For example, when source node 31 sends copies of data packet 1302 along paths P4 and P5, each copy indicating its respective path, as well as their corresponding dPDRs. For instance, source node 31 may indicate a dPDR=0.75 in the copy of packet 1302 sent via middle path P4 and indicate a dPDR=0.55 for the copy of packet 1302 sent via lower path P5. As would be appreciated, these dPDR values total 1.3, which is the overall PDR desired by source node 31.

As each intermediate node forwards a data packet, it may compute the ePDR of the remainder of the path to the destination, based on the reverse OAM signaling and/or any information regarding the next hop along the path. For example, such hop information can be obtained by the node from L2 triggers, DLEP, local statistics regarding L2 acknowledgements, or the like.

In some embodiments, the flooded OAM packets may also indicate the PDR capacities of the various nodes, which can be expressed as (ePDR-dPDR). Such a value represents the amount of ePDR that is currently computed by the node and not consumed by the dPDR of the current data packets. For example, the flooded OAM packets may indicate the ePDR to the destination node along a certain path. The receiving node can then use this information to determine whether the path has the capacity to satisfy the dPDR of an incoming data packet. By including such PDR information in the OAM packets, the nodes are able to effectively notify their neighbors of any PDR capacity that can be offloaded and, if so, the amount (e.g., path P3 can absorb a dPDR of 0.15 or less, etc.).

Figure 13A:
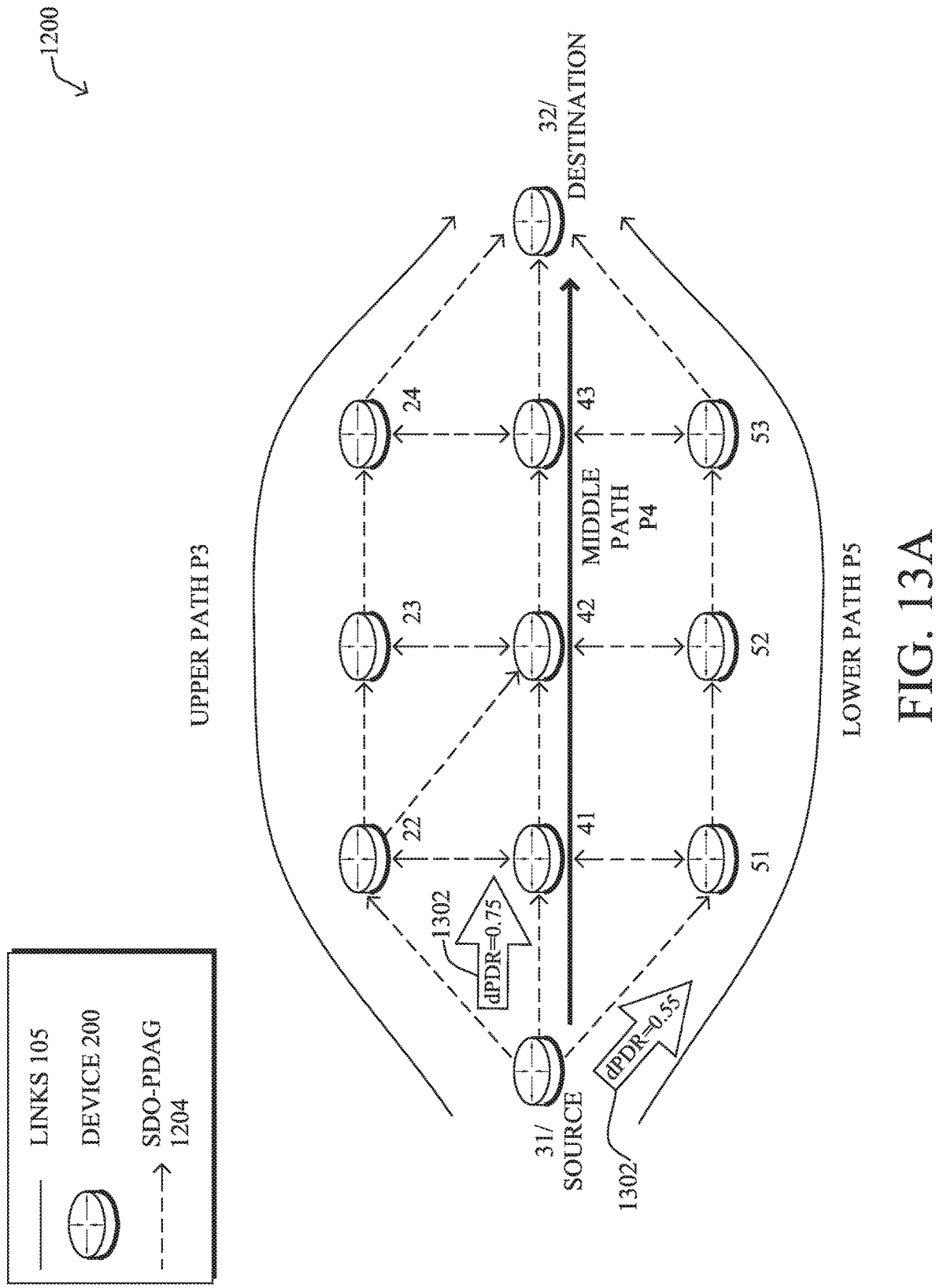
FIGS. 13A-13F illustrate examples of the operations of the intermediate nodes in an SDO-PDAG.
Figure 13B:
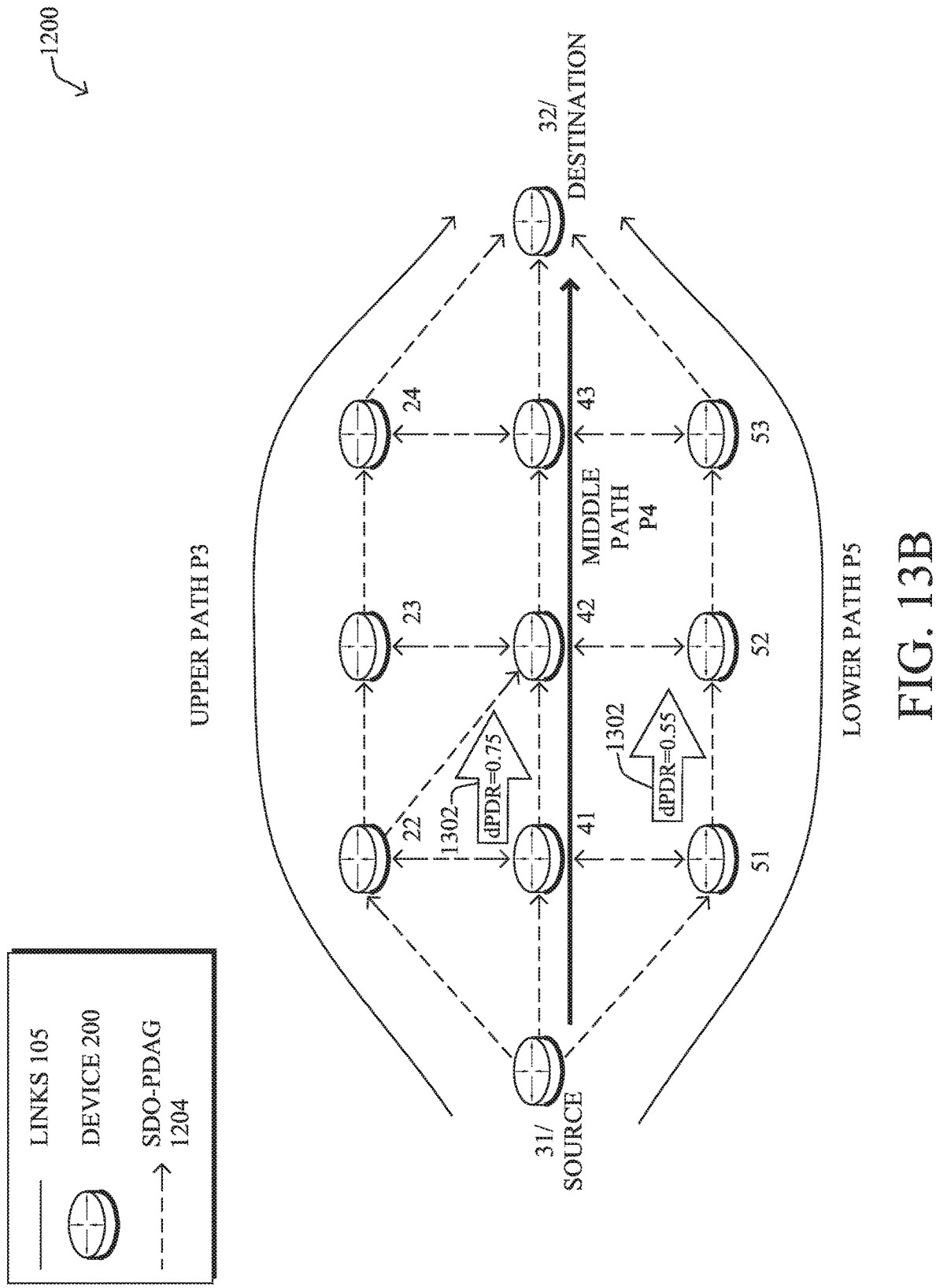

As shown in FIG. 13B, if the statistics that source node 31 used to compute the end-to-end ePDR still matches the current state of the network, or were more pessimistic, then the ePDR computed by each intermediate node along the end-to-end path to destination node 32 will be better than the ePDR computed by source node 31. This is because the chances of loss from source node 31 to the intermediate node are removed from the computation. In such a case, the data packet 1302 will be forwarded as-is along the non-congruent, end-to-end path(s) selected by source node 31 and there is no need for further packet replication. For example, assume that node 41 receives packet 1302 from source node 31. If the remainder of path P4 (i.e., nodes 42→43→32) has an ePDR greater than that of the dPDR=0.75 indicated by packet 1302, intermediate node 41 may simply forward the packet 1302 on to the next hop along path P4, node 42. This process may repeat until the packet arrives at destination node 32. The copy of packet 1302 sent is via lower path P5 may be processed in a similar manner, if the remainder of P5 continues to exhibit the required PDR capacity.

Note, however, that the intermediate nodes in an SDO-PDAG will typically have fresher information regarding the remainder of the path than that of the source node. This may be due to the intermediate node receiving signaling from its next hop (e.g., via failing retries, etc.), more recent OAM flooding, or the like. Thus, it may be the case that the intermediate node determines that the remainder of the path to the destination node actually has a lower ePDR than the dPDR indicated by the data packet.

Figure 13C:
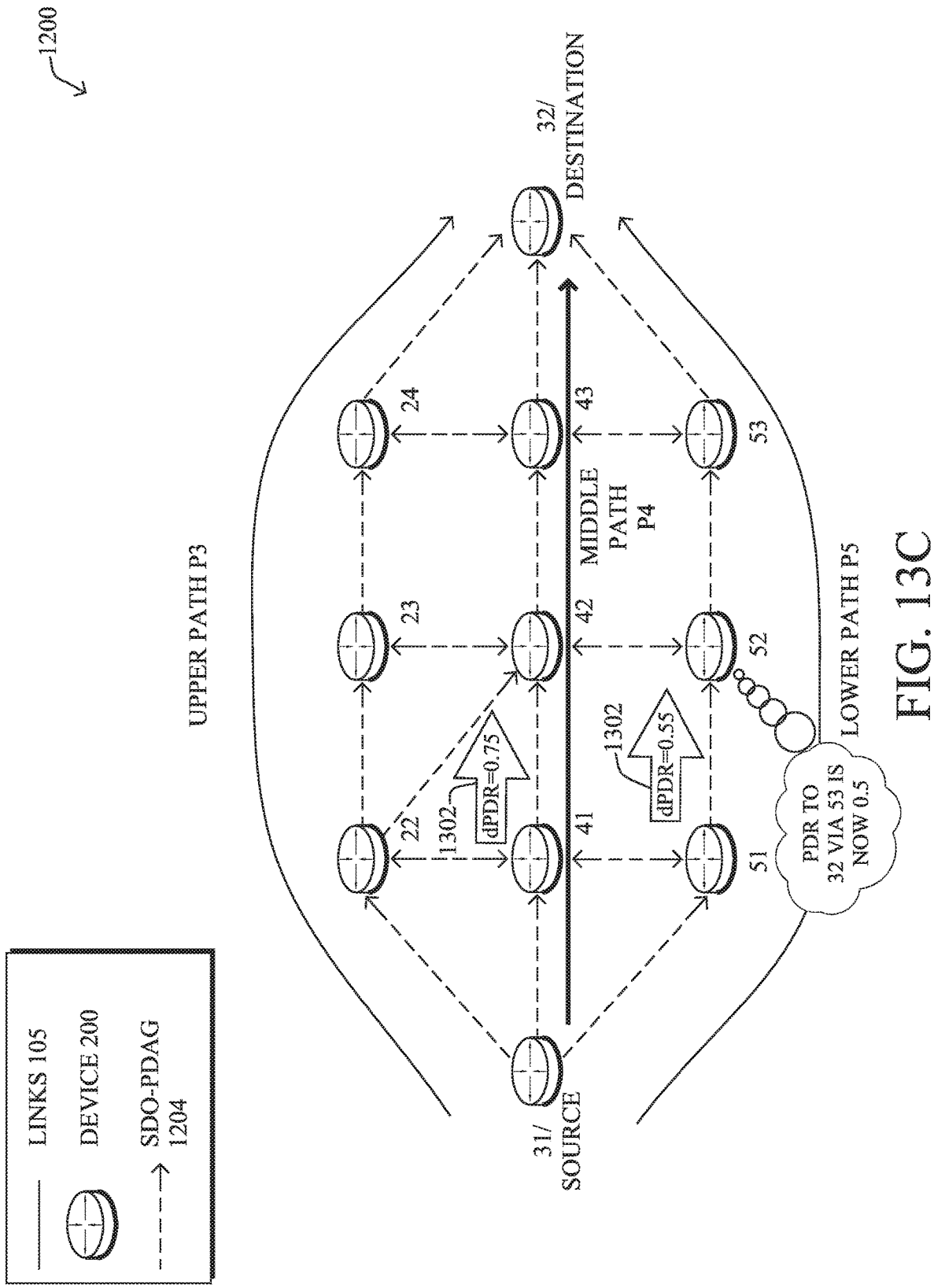

For example, as shown in FIG. 13C, assume that intermediate node 52 along lower path P5 receives a copy of data packet 1302 that indicates a dPDR=0.55, but the remainder of path P5 now only has an ePDR of 0.5. In other words, even though source node 31 may believe that path P5 is able to accommodate a dPDR=0.55, node 52 may not, based on its current information regarding the remainder of path P5.

In various embodiments, an intermediate node that receives a packet that indicates a dPDR value may observe packets of the flow and/or variations, to infer the value of the next packet. For example, node 42 may detect that packet ratio from node 31 is not meeding a dPDR of 0.75 (e.g., it only receives one in three packets, etc.). Alternatively, node 42 may be experiencing more retries than normal. For example, the scheduled first try for a packet fails and it is unclear whether a scheduled retry will work, and the avoidance of four losses in a row is compromised. Based on such detection, node 42 may also listen in on transmissions from node 22 and/or node 23, also known as overhearing. In turn, node 42 may inject a packet overheard from node 22 and/or node 23 along middle path P4, if node 23 failed to receive a packet from node 22, for example. Node 42 may also rewrite the dPDR of this packet based on its learning of dPDR values from node 31. When node 42 detects that the receiving rate from node 31 is back to normal (e.g., >75%), it may cease its overhearing mechanism, in order to preserve energy.

According to various embodiments, when an intermediate node in the SDO-PDAG determines that the remainder of the path cannot satisfy the dPDR indicated by the data packet, it may opt to employ packet replication. In such cases, the node lowers the dPDR in the packet and creates a replication of the packet that it sends over an alternate path with the remainder of the dPDR, at least for the portion of that remainder can be offloaded, based on the current OAM signaling.

Figure 13D:
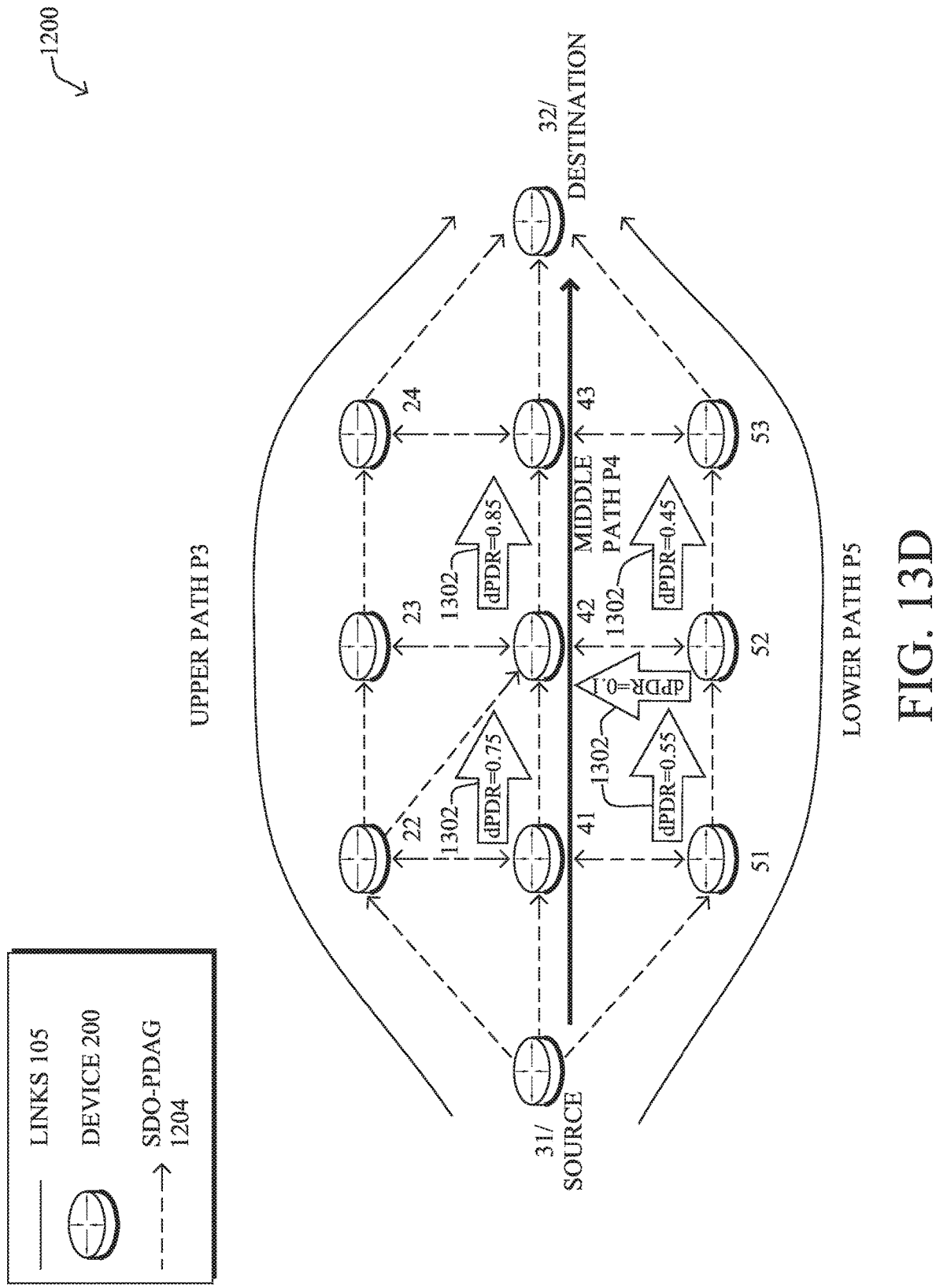
Figure 13E:
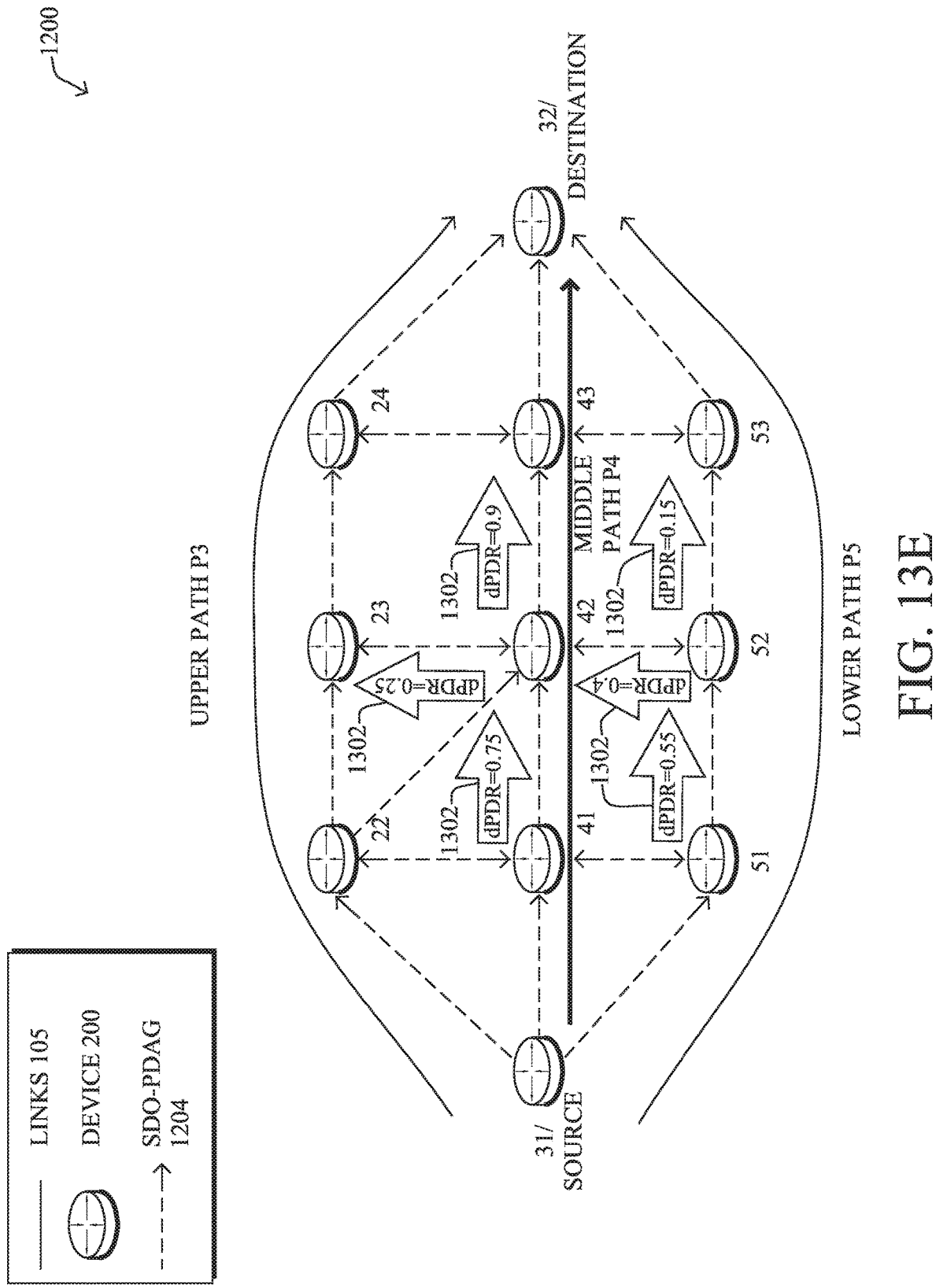
Figure 13F:
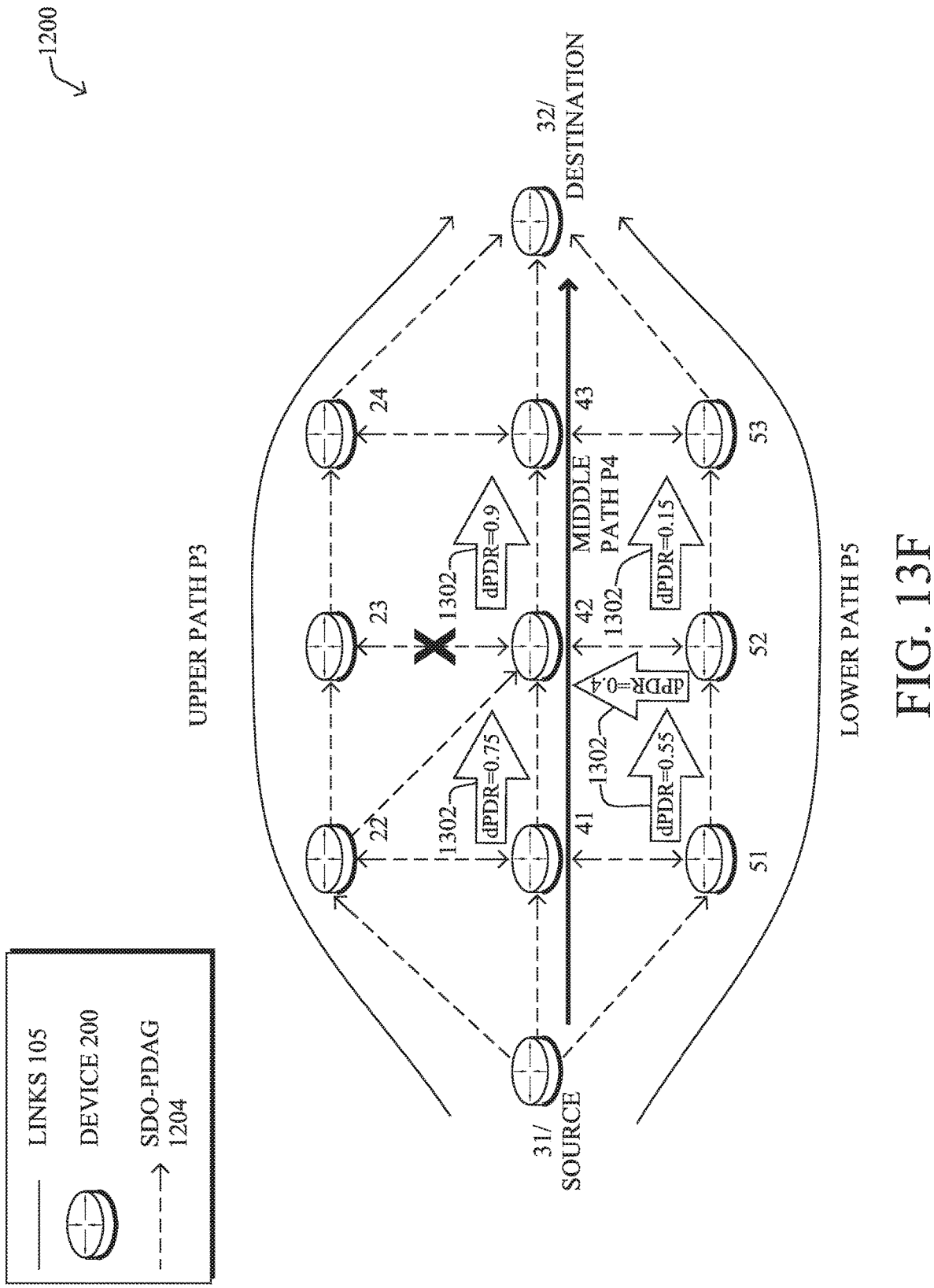

For instance, in FIG. 13D, assume that node 52 determines that the ePDR of lower path P5 is 0.5 and cannot satisfy the dPDR=0.55 of the copy of data packet 1302 that it receives. In such a case, node 52 may replicate packet 1302 and forward a first copy of packet 1302 onward down path P5 with an indicated dPDR=0.45 and a second copy of packet 1302 along the bridging path to node 42 with an indicated dPDR=0.10.

In another embodiment, the elimination function in a node considers the dPDRs from the copies of the packet and, if the resulting value is less than the ePDR for the rest of the path to the destination, then the elimination function produces a single packet with dPDR set to the sum of the dPDR values of the incoming copies of the packet. For example, as shown in FIG. 13D, node 42 located along the middle, end-to-end path P4 may receive copies of data packet 1302 from both nodes 41 and 52. In such a case, node 42 may employ its elimination function, to see whether these copies can be forwarded as a packet. For example, assume that node 42 determines that the remainder of path P4 has an ePDR=0.95. In such a case, node 42 may eliminate the copy of packet 1302 received from node 52, set the dPDR of the copy received from node 41 as dPDR=0.75+0.1=0.85 (e.g., the sum of the dPDR values of the packet copies), and forward the copy of packet 1302 with a dPDR=0.85 onward down path P4.

Of course, it may also be the case that the remaining portion of the end-to-end path may not be able to absorb the dPDRs of all duplicate copies of a packet received by an intermediate node. For example, as show in FIG. 13E, assume instead that node 52 determines that the remainder of path P5 has an ePDR=0.2 due, for example, to transient interference on its link 105 with node 53 that results in retries along that hop. In such a case, node 52 may replicate the copy of packet 1302 that it receives and forward one copy along path P5 with a dPDR=0.15 (e.g., lower than the ePDR=0.2 for the remainder of P5) and a second copy along the bypass path to node 42 with a dPDR=0.4.

Assume again that node 42 determines that the remainder of path P4 does not have capacity to satisfy the sum of the dPDR values of the copies of packet 1302 received by node 42 from nodes 41 and 52 (e.g., the ePDR for the remainder of P4 is 0.95). In response, node 42 may forward one copy of packet 1302 onward down path P4 with a dPDR=0.9 and another copy along the bypass path to node 23 with a dPDR=0.25. In other words, if node 42 cannot eliminate one of the copies of packet 1302, it may still attempt to rebalance their dPDR values according to the capacities of the paths on which they are forwarded.

As would be appreciated, a further situation may arise whereby the current end-to-end path cannot accommodate the dPDR of the copies of a data packet received by an intermediate node and no alternate path exists. For example, as shown in FIG. 13F, assume again the same conditions as in FIG. 13E, but that the link 105 between node 42 and 23 is broken or has a considerably low ePDR. In such a case, in various embodiments, node 42 may opt to replicate packet 1302 by sending a copy of packet 1302 along path P4 with a dPDR set according to the capacity of the remainder of the path (e.g., dPDR=0.9) and resend the packet again along the path, in an effort to achieve the combined dPDR of the copies that it received.

Figure 14:
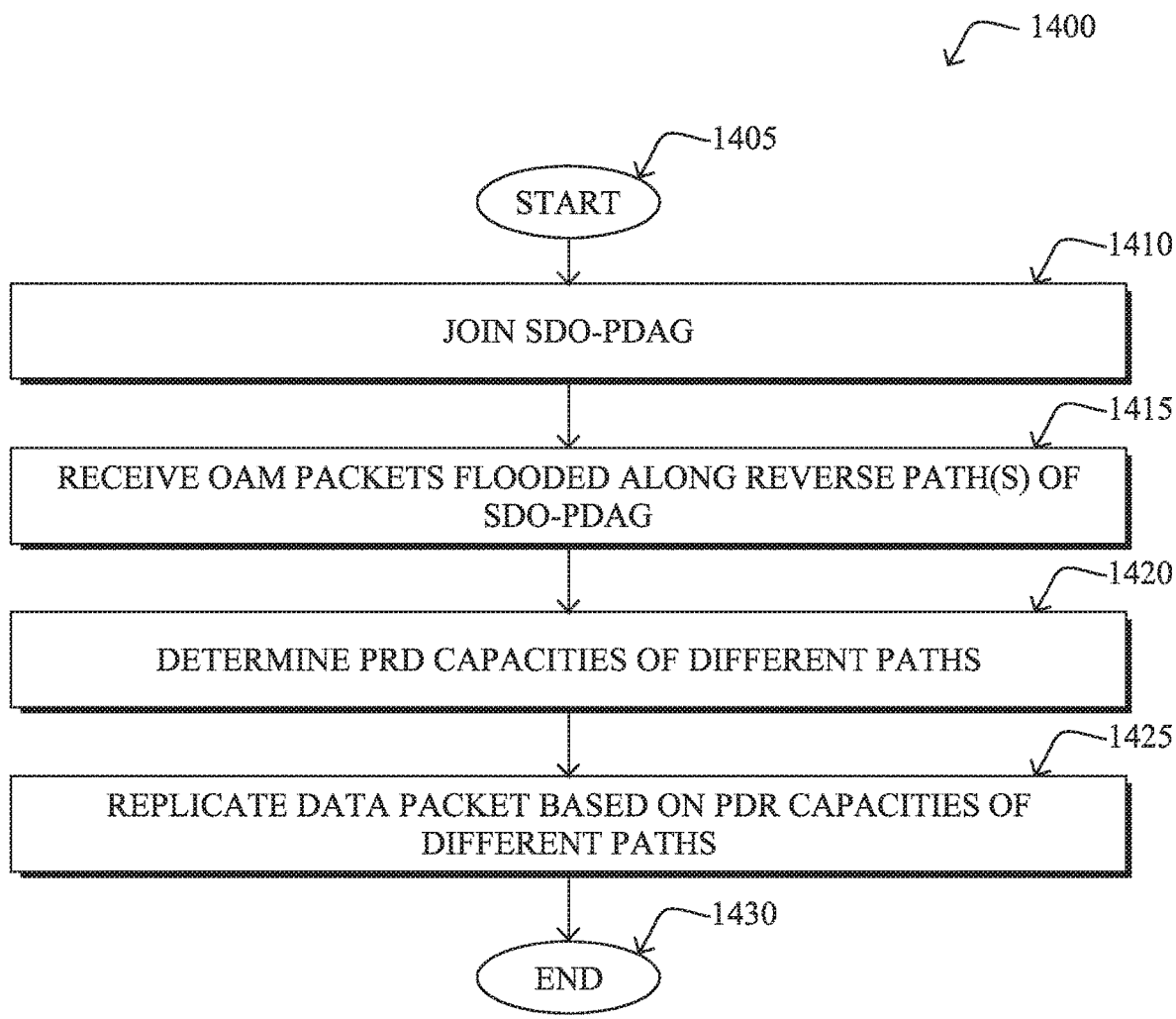
FIG. 14 illustrates an example simplified procedure for replicating a data packet in an SDO-PDAG based on reverse OAM signaling.

FIG. 14 illustrates an example simplified procedure for replicating a data packet in an SDO-PDAG based on reverse OAM signaling, in accordance with one or more embodiments described herein. For example, a non-generic, specifically configured node/device (e.g., device 200) in a mesh network (e.g., an LLN) may perform procedure 1400 by executing stored instructions (e.g., processes 244, 248). The procedure 1400 may start at step 1405, and continues to step 1410, where, as described in greater detail above, the device may join a source-destination oriented partial directed acyclic graph (SDO-PDAG) between a source node and a destination node in the network. For example, the device may receive a Projected Destination Advertisement Object (PDAO) indicative of the SDO-PDAG sent by a path computation engine (PCE) in the network that computed the SDO-PDAG that is indicative of the SDO-PDAG. In some embodiments, the PDAO may also indicate whether a particular one of the paths between the device and the destination node is an end-to-end path or a replication-elimination bridging path.

At step 1415, the device may receive operations, administration and maintenance (OAM) packets flooded along reverse paths of the SDO-PDAG. In various embodiments, the OAM packets may only be flooded along non-congruent or replication-elimination bridging paths of the reverse paths of the SDO-PDAG, so as to conserve resources. In general, the flooded OAM packets may be indicative of the expected performance of the remainder of a particular path between the device and the destination node in the SDO-PDAG, such as its packet drop rate (PDR).

At step 1420, the device may, based on the received OAM packets, PDR capacities of different paths between the device and the destination node, as described in greater detail above. For example, the device may receive a copy of a data packet sent from the source node towards the destination node of the SDO-PDAG with an indication of the desired PDR (dPDR) of the packet. In such a case, the device may determine the PDR capacities of the different paths available to the device to the destination as the differences between the desired PDR for the packet and estimated PDRs for those paths.

At step 1425, as detailed above, the device may replicate a data packet sent from the source node to the destination node along two or more of the paths between the device and the destination node, based on the determined PDR capacities of those paths. For example, if the device determines that the remainder of the end-to-end path between the source and destination on which the device lies cannot accommodate the dPDR of the packet, the device may send copies of the packet along the different paths with dPDR values set according to the capacities of those paths. Procedure 1400 then ends at step 1430.

It should be noted that while certain steps within procedure 1400 may be optional as described above, the steps shown in FIG. 14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for packets to be sent between a source and destination node in a mesh network in a manner that supports determinism, while still consuming fewer resources than implementing full redundancy between the nodes. In some aspects, forwarding, replication, and elimination decisions can be made on the fly by the corresponding nodes/devices, by leveraging OAM packets flooded in the reverse direction (e.g., from the destination towards the source).

While there have been shown and described illustrative embodiments that provide for the reverse OAM signaling in a mesh network, it is to be understood that various other adaptations and modifications may be made within the spirit and scope of the embodiments herein. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   joining, by a device in a mesh network, a source-destination oriented partial directed acyclic graph (SDO-PDAG) between a source node and a destination node in the network;
   receiving, at the device, operations, administration and maintenance (OAM) packets flooded along reverse paths of the SDO-PDAG;
   determining, by the device, after reception of the OAM packets, packet drop rate (PDR) capacities of different paths between the device and the destination node; and
   replicating, by the device, a data packet sent from the source node to the destination node along two or more of the paths between the device and the destination node, based on the determined PDR capacities of those paths.

2. The method as in claim 1, wherein joining the SDO-PDAG comprises:
   receiving, at the device, a Projected Destination Advertisement Object (PDAO) indicative of the SDO-PDAG and sent by a path computation engine (PCE) in the network that computed the SDO-PDAG.

3. The method as in claim 2, wherein the PDAO indicates whether a particular one of the paths between the device and the destination node is an end-to-end path or a replication-elimination bridging path.

4. The method as in claim 1, wherein the OAM packets are only flooded along non-congruent or replication-elimination bridging paths of the reverse paths of the SDO-PDAG.

5. The method as in claim 1, wherein the data packet sent from the source node to the destination node indicates a desired PDR for the packet.

6. The method as in claim 5, wherein the PDR capacities of the different paths are indicative of differences between the desired PDR for the packet and estimated PDRs for those paths.

7. The method as in claim 5, wherein the device replicates the data packet along the two or more different paths between the device and the destination node when a particular one of those paths is not estimated to be able to satisfy the desired PDR for the packet.

8. The method as in claim 1, further comprising:
receiving, at the device, duplicates of a particular packet sent from the source node towards the destination node, each duplicate indicating a desired PDR;
determining, by the device, that a particular one of the paths between the device and the destination node has a PDR capacity that is able to satisfy a sum of the desired PDRs of the duplicates of the particular packet;
eliminating one of the duplicates by forwarding the particular packet along the particular path between the device and the destination node, wherein the forwarded packet indicates a desired PDR that is the sum of the desired PDRs of the duplicates.

9. The method as in claim 1, further comprising:
receiving, at the device, duplicates of a particular packet sent from the source node towards the destination node, each duplicate indicating a desired PDR;
determining, by the device, that none of the paths between the device and the destination node have PDR capacities that are able to satisfy a sum of the desired PDRs of the duplicates of the particular packet;
rebalancing, by the device, the desired PDRs of the duplicates of the particular packet based on the PDR capacities of the one or more paths between the device and the destination node; and
forwarding, by the device, the duplicates of the particular packet along different ones of the paths between the device and the destination node with the corresponding desired PDRs rebalanced by the device.

10. The method as in claim 1, wherein the OAM packets are flooded along the reverse paths of the SDO-PDAG at a frequency that is lower than that of packets sent from the source node to the destination node.

11. An apparatus, comprising:
one or more network interfaces to communicate with a mesh network;
a processor coupled to the network interfaces and configured to execute one or more processes; and
a memory configured to store a process executable by the processor, the process when executed configured to:
join a source-destination oriented partial directed acyclic graph (SDO-PDAG) between a source node and a destination node in the network;
receive operations, administration and maintenance (OAM) packets flooded along reverse paths of the SDO-PDAG;
determine, after reception of the OAM packets, packet drop rate (PDR) capacities of different paths between the apparatus and the destination node; and
replicate a data packet sent from the source node to the destination node along two or more of the paths between the apparatus and the destination node, based on the determined PDR capacities of those paths.

12. The apparatus as in claim 11, wherein the apparatus joins the SDO-PDAG by:
receiving a Projected Destination Advertisement Object (PDAO) indicative of the SDO-PDAG and sent by a path computation engine (PCE) in the network that computed the SDO-PDAG.

13. The apparatus as in claim 12, wherein the PDAO indicates whether a particular one of the paths between the apparatus and the destination node is an end-to-end path or a replication-elimination bridging path.

14. The apparatus as in claim 11, wherein the apparatus overheard transmission of the data packet between two nodes in the network, prior to replicating the data packet.

15. The apparatus as in claim 11, wherein the data packet sent from the source node to the destination node indicates a desired PDR for the packet.

16. The apparatus as in claim 15, wherein the PDR capacities of the different paths are indicative of differences between the desired PDR for the packet and estimated PDRs for those paths.

17. The apparatus as in claim 15, wherein the apparatus replicates the data packet along the two or more different paths between the apparatus and the destination node when a particular one of those paths is not estimated to be able to satisfy the desired PDR for the packet.

18. The apparatus as in claim 11, wherein the process when executed is further configured to:
receive duplicates of a particular packet sent from the source node towards the destination node, each duplicate indicating a desired PDR;
determine that a particular one of the paths between the apparatus and the destination node has a PDR capacity that is able to satisfy a sum of the desired PDRs of the duplicates of the particular packet;
eliminate one of the duplicates by forwarding the particular packet along the particular path between the apparatus and the destination node, wherein the forwarded packet indicates a desired PDR that is the sum of the desired PDRs of the duplicates.

19. The apparatus as in claim 11, wherein the process when executed is further configured to:
receive duplicates of a particular packet sent from the source node towards the destination node, each duplicate indicating a desired PDR;
determine that none of the paths between the apparatus and the destination node have PDR capacities that are able to satisfy a sum of the desired PDRs of the duplicates of the particular packet;
rebalance the desired PDRs of the duplicates of the particular packet based on the PDR capacities of the one or more paths between the apparatus and the destination node; and
forward the duplicates of the particular packet along different ones of the paths between the apparatus and the destination node with the corresponding desired PDRs rebalanced by the apparatus.

20. A tangible, non-transitory, computer-readable medium having software encoded thereon, the software when executed by a device in a mesh network configured to:

joining, by the device, a source-destination oriented partial directed acyclic graph (SDO-PDAG) between a source node and a destination node in the network;

receiving, at the device, operations, administration and maintenance (OAM) packets flooded along reverse paths of the SDO-PDAG;

determining, by the device, after reception of the OAM packets, packet drop rate (PDR) capacities of different paths between the device and the destination node; and replicating, by the device, a data packet sent from the source node to the destination node along two or more of the paths between the device and the destination node, based on the determined PDR capacities of those paths.

* * * * *

UNITED STATES PATENT AND TRADEMARK OFFICE
CERTIFICATE OF CORRECTION

PATENT NO. : 11,265,763 B2
APPLICATION NO. : 16/594316
DATED : March 1, 2022
INVENTOR(S) : Pascal Thubert Page 1 of 1

It is certified that error appears in the above-identified patent and that said Letters Patent is hereby corrected as shown below:

In the Specification

Column 9, Line 3, please amend as shown:
may be a plurality of fields used to relay the pertinent information. In particular, the fields may Column 14, Line 40, please amend as shown:
such as L2-triggers, Dynamic Link Exchange Protocol Column 19, Line 43, please amend as shown:
node 32. The copy of packet 1302 sent via lower path P5

Signed and Sealed this
Eleventh Day of October, 2022

Katherine Kelly Vidal
*Director of the United States Patent and Trademark Office*